United States Patent
Lee et al.

(10) Patent No.: US 12,309,689 B2
(45) Date of Patent: May 20, 2025

(54) METHOD AND APPARATUS FOR SUPPORTING NETWORK SLICE IN WIRELESS COMMUNICATION SYSTEM

(71) Applicant: Samsung Electronics Co., Ltd., Suwon-si (KR)

(72) Inventors: Hoyeon Lee, Suwon-si (KR); Youngsung Kho, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 17/672,133

(22) Filed: Feb. 15, 2022

(65) Prior Publication Data

US 2022/0264443 A1   Aug. 18, 2022

(30) Foreign Application Priority Data

Feb. 15, 2021   (KR) ........................ 10-2021-0020153

(51) Int. Cl.
| | |
|---|---|
| *H04W 8/04* | (2009.01) |
| *H04W 8/20* | (2009.01) |
| *H04W 8/26* | (2009.01) |
| *H04W 12/06* | (2021.01) |
| *H04W 48/18* | (2009.01) |
| *H04W 60/00* | (2009.01) |
| *H04W 60/04* | (2009.01) |

(52) U.S. Cl.
CPC ............. *H04W 48/18* (2013.01); *H04W 8/20* (2013.01); *H04W 60/00* (2013.01)

(58) Field of Classification Search
CPC ........ H04W 48/18; H04W 8/20; H04W 60/00
USPC ....................................................... 455/435.1
See application file for complete search history.

(56) References Cited

U.S. PATENT DOCUMENTS

| | | |
|---|---|---|
| 2018/0368061 A1 | 12/2018 | Yu et al. |
| 2019/0053148 A1 | 2/2019 | Lee et al. |
| 2019/0182875 A1 | 6/2019 | Talebi Fard et al. |
| 2019/0261157 A1 | 8/2019 | Ramle et al. |
| 2019/0313359 A1* | 10/2019 | Lee ........................ H04W 76/14 |
| 2020/0267781 A1 | 8/2020 | Lee et al. |
| 2020/0351766 A1 | 11/2020 | Young |
| 2021/0029628 A1* | 1/2021 | Kim ....................... H04W 48/18 |
| 2021/0068073 A1* | 3/2021 | Sivavakeesar .... H04W 74/0833 |
| 2021/0099945 A1* | 4/2021 | Watfa .................... H04W 48/18 |
| 2023/0336985 A1* | 10/2023 | Zisimopoulos ....... H04W 48/18 |

FOREIGN PATENT DOCUMENTS

KR   10-2020-0091308 A   7/2020

OTHER PUBLICATIONS

IP.com (Year: 2024).*
ProQuest (Dialog) (Year: 2024).*
(Continued)

*Primary Examiner* — Moustapha Diaby
(74) *Attorney, Agent, or Firm* — Jefferson IP Law, LLP

(57) ABSTRACT

The disclosure relates to a 5G or 6G communication system for supporting a higher data transmission rate. A method and an apparatus for efficiently providing network slicing in a wireless communication system or a mobile communication system are provided.

12 Claims, 18 Drawing Sheets

(56) References Cited

OTHER PUBLICATIONS

LG Electronics, 'Discussion on the mapping between NSSAIs', C1-183282, 3GPP TSG-CT WG1 Meeting #111, Osaka, Japan, May 14, 2018.
International Search Report and Written Opinion dated May 12, 2022, issued in International Patent Application No. PCT/KR2022/002232.
3GPP; 3rd Generation Partnership Project; Technical Specification Group Services System Aspects; Procedures for the 5G System (5GS); Stage 2 (Release 16); 3GPP TS 23.502; V16.7.1; (Jan. 2021); XP051999855; Sophia-Antipolis Cedex, France; Jan. 13, 2021.
Extended European Search Report dated Mar. 6, 2024; European Appln. No. 22753034.2-1216 / 4229918 PCT/KR2022002232.

* cited by examiner

METHOD AND APPARATUS FOR SUPPORTING NETWORK SLICE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0020153, filed on Feb. 15, 2021, in the Korean Intellectual Property Office, the disclosure of which is incorporated by reference herein in its entirety.

BACKGROUND

1. Field

The disclosure relates to a wireless communication system. More particularly, the disclosure relates to an apparatus and method for providing network slicing in a wireless communication system or a mobile communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

With the development of the 5G communication system, a network slice (or network slicing) technology for a radio access network (RAN) and core network (CN) structure has been introduced.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for efficiently providing network slicing in a wireless communication system or a mobile communication system.

Additional aspects will be set forth in part in the description which follows and, in part, will be apparent from the description, or may be learned by practice of the presented embodiments.

In accordance with an aspect of the disclosure, a method performed by an access and mobility management function (AMF) in a wireless communication system is provided. The method includes receiving, from a terminal, a registration request message including requested network slice selection assistance information (NSSAI), transmitting, to a unified data management (UDM), a subscription data request message including an identifier of the terminal, as a response to the subscription data request message, receiving, from the UDM, subscribed NSSAI for the terminal, and determining accepted NSSAI for the terminal including at least one single-NSSAI (S-NSSAI) based on the requested NSSAI and the subscribed NSSAI. The number of S-NSSAIs of the subscribed NSSAI received from the UDM is equal to or smaller than 16.

In accordance with an aspect of the disclosure, a method performed by a UDM in a wireless communication system is provided. The method includes receiving, from an AMF, a subscription data request message including an identifier of the terminal, identifying a subscription data for the terminal based on the identifier of the terminal; and as a response to the subscription data request message, transmitting, to the AMF, subscribed NSSAI for the terminal based on the subscription data. The number of S-NSSAIs of the subscribed NSSAI received from the UDM is equal to or smaller than 16.

In accordance with an aspect of the disclosure, an AMF in a wireless communication system is provided. The AMF includes a transceiver and a controller. The controller is configured to receive, from a terminal via the transceiver, a registration request message including requested NSSAI, transmit, to a UDM via the transceiver, a subscription data request message including an identifier of the terminal, as a response to the subscription data request message, receive, from the UDM via the transceiver, subscribed NSSAI for the terminal, and determine accepted NSSAI for the terminal including at least one S-NSSAI based on the requested NSSAI and the subscribed NSSAI. The number of S-NSSAIs of the subscribed NSSAI received from the UDM is equal to or smaller than 16.

In accordance with an aspect of the disclosure, a UDM in a wireless communication system is provided. The UDM includes a transceiver and a controller. The controller is configured to receive, from an AMF via the transceiver, a subscription data request message including an identifier of the terminal, identify a subscription data for the terminal based on the identifier of the terminal, and as a response to the subscription data request message, transmit, to the AMF via the transceiver, subscribed NSSAI for the terminal based on the subscription data. The number of S-NSSAIs of the subscribed NSSAI received from the UDM is equal to or smaller than 16.

According to an embodiment of the disclosure, a 5G network system providing a network slice function may efficiently manage network slice selection assistance information (NSSAI) information.

In addition, according to another embodiment of the disclosure, the 5G network system providing the network slice function may efficiently configure the NSSAI information to a terminal.

Also, according to still another embodiment of the disclosure, the terminal providing the network slice function may efficiently process the NSSAI information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
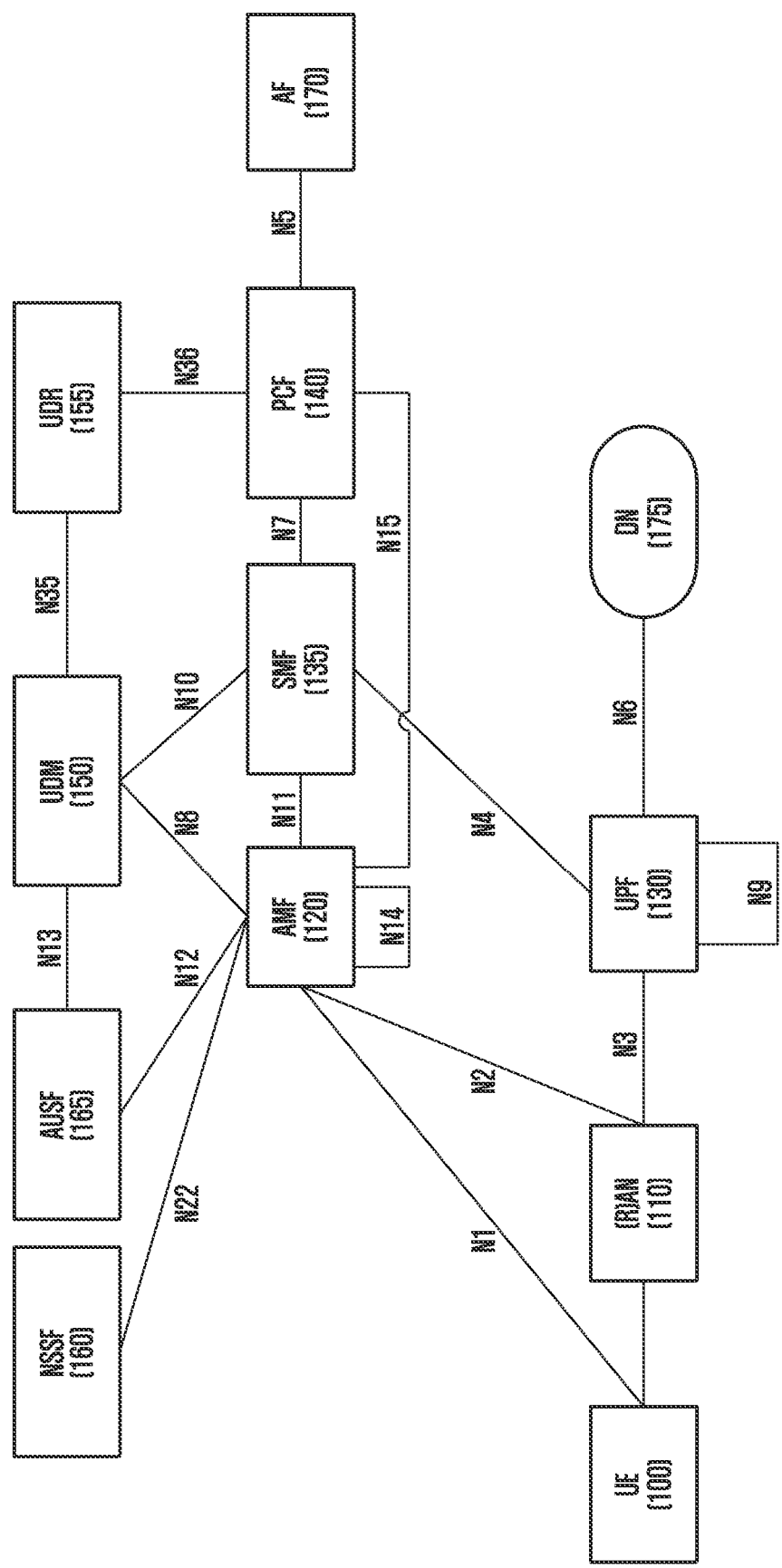
FIG. 1 is a diagram illustrating a structure of a mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card.

The disclosure discloses an apparatus and method for providing a network slice (or network slicing) in a wireless communication system. Specifically, a technology for managing network slice information in a wireless communication system that provides a network slice function will be described through the disclosure. In addition, a technology for interworking between a wireless communication system and a user equipment (UE) will be described.

Terms that refer to signals, terms that refer to channels, terms that refer to control information, terms that refer to network entities, and terms that refer to components of devices to be used in the following description are exemplified for convenience of description. Therefore, the present is not limited to the terms described below, and other terms having equivalent technical meanings may be used.

In addition, although the disclosure describes various embodiments using terms used in some communication standards (e.g., 3rd Generation Partnership Project (3GPP)), this is only an example for description. Various embodiments of the disclosure may be easily modified and applied in other communication systems.

The 3GPP standard deals with standardization of the 5G network system architecture and procedures. Mobile communication operators can provide a number of services in the 5G network. In order to provide respective services, the mobile communication operators need to satisfy different service requirements (e.g., latency, communication range, data rate, bandwidth, reliability, etc.) for the respective services. To this end, the mobile communication operators may construct a network slice and allocate network resources suitable for a specific service for each network slice or for each set of network slices. The network resources may mean a network function (NF), logical resources provided by the NF, radio resource allocation of a base station, and the like.

For example, the mobile communication operator may construct a network slice A to provide a mobile broadband service, construct a network slice B to provide a vehicle communication service, and construct a network slice C to provide an IoT service. That is, in the 5G network, each service can be efficiently provided to a UE through a network slice specialized for the characteristics of each service.

FIG. 1 is a diagram illustrating a structure of a mobile communication system according to an embodiment of the disclosure.

Referring to FIG. 1, a 5G system (5GS) may include a user equipment (UE), a (radio) access network ((R)AN), and a 5G core network (5GC).

The 5G core network may be composed of an access and mobility management function (AMF) 120, a session management function (SMF) 135, a user plane function (UPF) 130, a policy control function (PCF) 140, a unified data management (UDM) 150, a network slice selection function (NSSF) 160, an authentication server function (AUSF) 165, a unified data repository (UDR) 155, and the like. The user equipment (UE) 100 may access the 5G core network through the (radio) access network ((R)AN) 110. Hereinafter, the UE may be referred to as a terminal, and the (R)AN may be referred to as a base station. In addition, the 5G core network may further include an application function (AF) 170 and a data network (DN) 175.

According to an embodiment, the AMF 120 may be a network function (NF) that manages wireless network access and mobility for the UE 100.

The SMF 135 is an NF that manages a session for the UE, and session information may include quality of service (QoS) information, charging information, and packet processing information.

The UPF 130 is an NF that processes user traffic (e.g., user plane traffic), and may be controlled by the SMF 135.

The PCF 140 may be an NF that manages an operator policy (PLMN policy) for providing a service in a wireless communication system. Additionally, the PCF 140 may be divided into a PCF in charge of an access and mobility (AM) policy and a UE policy, and a PCF in charge of a session management (SM) policy. The PCF in charge of AM/UE policy and the PCF in charge of SM policy may be logically or physically separate NFs or logically or physically one NF.

The UDM 150 may be an NF that stores and manages UE subscriber information (UE subscription).

The UDR 155 is an NF or database (DB) that stores and manages data. The UDR 155 may store UE subscription information and provide the UE subscription information to the UDM 150. In addition, the UDR 155 may store operator policy information and provide the operator policy information to the PCF 140.

The NSSF 160 may be an NF that performs a function of selecting network slice instances serving the UE or determining network slice selection assistance information (NSSAI).

The AUSF 165 may be an NF that performs a function of supporting authentication for 3GPP access and non-3GPP access.

The AF 170 may be an NF that provides a function for a service according to the disclosure.

The DN 175 may refer to a data network that may provide a service provider's service, Internet access, a third party's service, or the like.

Figure 2:
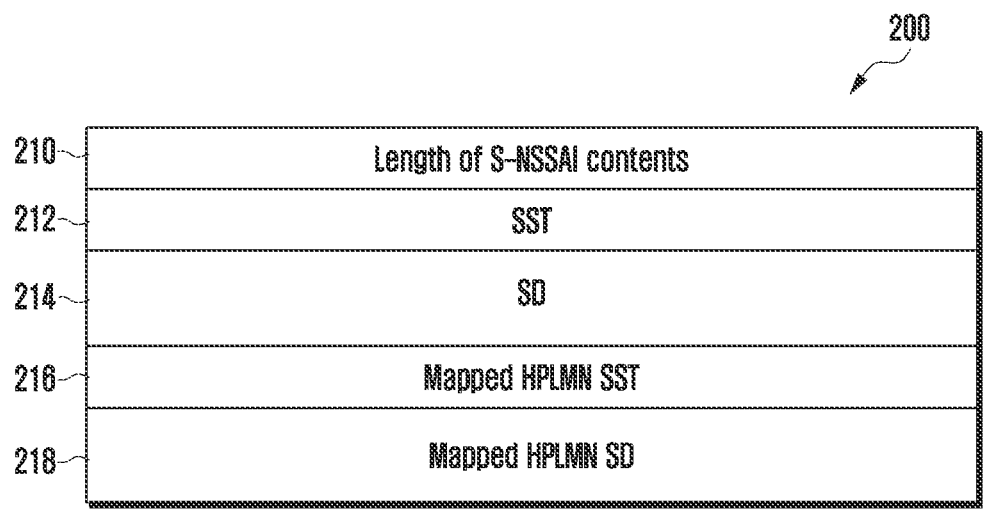
FIG. 2 is a diagram illustrating a configuration of an identifier information element (IE) for identifying a network slice according to an embodiment of the disclosure.

FIG. 2 is a diagram illustrating a constitution of an identifier IE for identifying a network slice according to an embodiment of the disclosure.

As an identifier for identifying a network slice, single-network slice selection assistance information (S-NSSAI) defined in 3GPP may be used. FIG. 2 shows an example of the constitution of such an S-NSSAI information element (IE). One S-NSSAI 200 may include at least one of a slice/service type (SST) 216 used in a home public land mobile network (home PLMN, HPLMN), a slice differentiator (SD) 218 used in the HPLMN, an SST 212 used in a serving PLMN, and an SD 214 used in the serving PLMN. In addition, the S-NSSAI IE may further include a field 210 that indicates the length of contents contained in the S-NSSAI IE.

In a non-roaming situation, the SST 212 used in the serving PLMN may be identical with the SST 216 used in the HPLMN, and also the SD 214 used in the serving PLMN may be identical with the SD 218 used in the HPLMN.

In a roaming situation, the SST 212 used in the serving PLMN may be an SST used in a visited PLMN (VPLMN), and also the SD 214 used in the serving PLMN may be an SD used in the VPLMN.

Each of SSTs and SDs constituting one S-NSSAI may or may not have a value depending on the situation.

The network slice selection assistance information (NSSAI) may consist of one or more S-NSSAIs. As examples of the NSSAI, the following types may be considered.

Subscribed NSSAI (or subscribed S-NSSAI(s)): Subscribed NSSAI (or S-NSSAI(s)) useable by the UE according to subscription information of the UE. The subscribed NSSAI may be stored in the UDM.

Configured NSSAI (or configured S-NSSAI(s)): NSSAI (or S-NSSAI(s)) provided to the UE such that the UE can apply it. The configured NSSAI may be stored in the UE or may be configured from the 5G network.

Requested NSSAI (or requested S-NSSAI(s)): NSSAI (or S-NSSAI(s)) requested to the network such that the UE can use it in the registration procedure.

Pending NSSAI (or pending S-NSSAI(s)): NSSAI (or S-NSSAI(s)) that is processing whether the UE is available (allow or reject).

Allowed NSSAI (or allowed S-NSSAI(s)): NSSAI (or S-NSSAI(s)) allowed to be used by the UE.

Rejected NSSAI (or rejected S-NSSAI(s)): NSSAI (or S-NSSAI(s)) rejected to use in the UE.

However, the above-listed NSSAIs are only examples, and the NSSAIs are not limited to the above examples.

The disclosure proposes a method that a 5G network system providing a network slice function manages NSSAI information.

In addition, the disclosure proposes a method that a 5G network system providing a network slice function transmits (configures) the NSSAI information to a UE.

In addition, the disclosure proposes a method that a UE providing a network slice function processes the NSSAI information.

A mobile communication system may divide a physical network into one or more logical networks and assign different characteristics to the respective logical networks to provide specialized services. This may be referred to as network slicing (or network slice). A mobile communication operator may divide a 5G network into one or more logical network slices, and each network slice may be identified using S-NSSAI as an identifier. The S-NSSAI is an IE consisting of 32 bits, and the mobile communication operator may provide a maximum of $2^{32}$ network slices. However, this is only an example, and the number of bits of the S-NSSAI and the maximum number of network slices that the mobile communication operator can provide are not limited to the above example.

A 5G UE may subscribe to a 5G network system and use a 5G network service. The UE subscription information for the 5G network system may include specific network slice information to which the UE subscribes, and this will be referred to as subscribed NSSAI (or subscribed S-NSSAI(s)) for convenience of explanation. The maximum value of the number of S-NSSAIs constituting the subscribed NSSAI of the UE may be equal to or less than the number of network slices (e.g., $2^{32}$) provided by the mobile communication service provider. The 5G network system may store the UE subscription information in at least one (e.g., UDM) of the 5G core network NFs shown in FIG. 1. The UE subscription information may include a UE indicator, a subscribed NSSAI of the UE, and the like.

The 5G UE subscribed to the 5G network system may store the network slice configuration information provided to the UE so that the UE can apply it, and this will be referred to as configured NSSAI (or configured S-NSSAI(s)) for convenience of explanation. The configured NSSAI may be configuration information stored by the UE or received from the 5G network.

Meanwhile, due to the limited resources of the UE, there may be a limit to the number of S-NSSAIs constituting the configured NSSAI that the UE can store. In this case, the number of S-NSSAIs (e.g., $2^4$) constituting the configured NSSAI that the UE can store may be less than the number of S-NSSAIs (e.g., $2^{32}$) constituting the subscribed NSSAI that is the UE subscribed specific network slice information stored in the 5G core network NF. For example, the subscribed NSSAI and the configured NSSAI may be constructed as follows.

Subscribed NSSAI:
{S-NSSAI 1, S-NSSAI 2, S-NSSAI 3, S-NSSAI 4, S-NSSAI 5, S-NSSAI 6, S-NSSAI 7, S-NSSAI 8, S-NSSAI 9, S-NSSAI 10, S-NSSAI 11, S-NSSAI 12, S-NSSAI 13, S-NSSAI 14, S-NSSAI 15, S-NSSAI 16, S-NSSAI 17, S-NSSAI 18, S-NSSAI 19, S-NSSAI 20}

Configured NSSAI:
{S-NSSAI 1, S-NSSAI 2, S-NSSAI 3, S-NSSAI 4, S-NSSAI 5, S-NSSAI 6, S-NSSAI 7, S-NSSAI 8, S-NSSAI 9, S-NSSAI 10, S-NSSAI 11, S-NSSAI 12, S-NSSAI 13, S-NSSAI 14, S-NSSAI 15, S-NSSAI 16}

However, this is only an example, and the scope of the disclosure is not limited to the above example.

The disclosure proposes a method for solving problems that may occur when the number of S-NSSAIs constituting the configured NSSAI and the number of S-NSSAIs constituting the subscribed NSSAI are different as described above.

Figure 3:
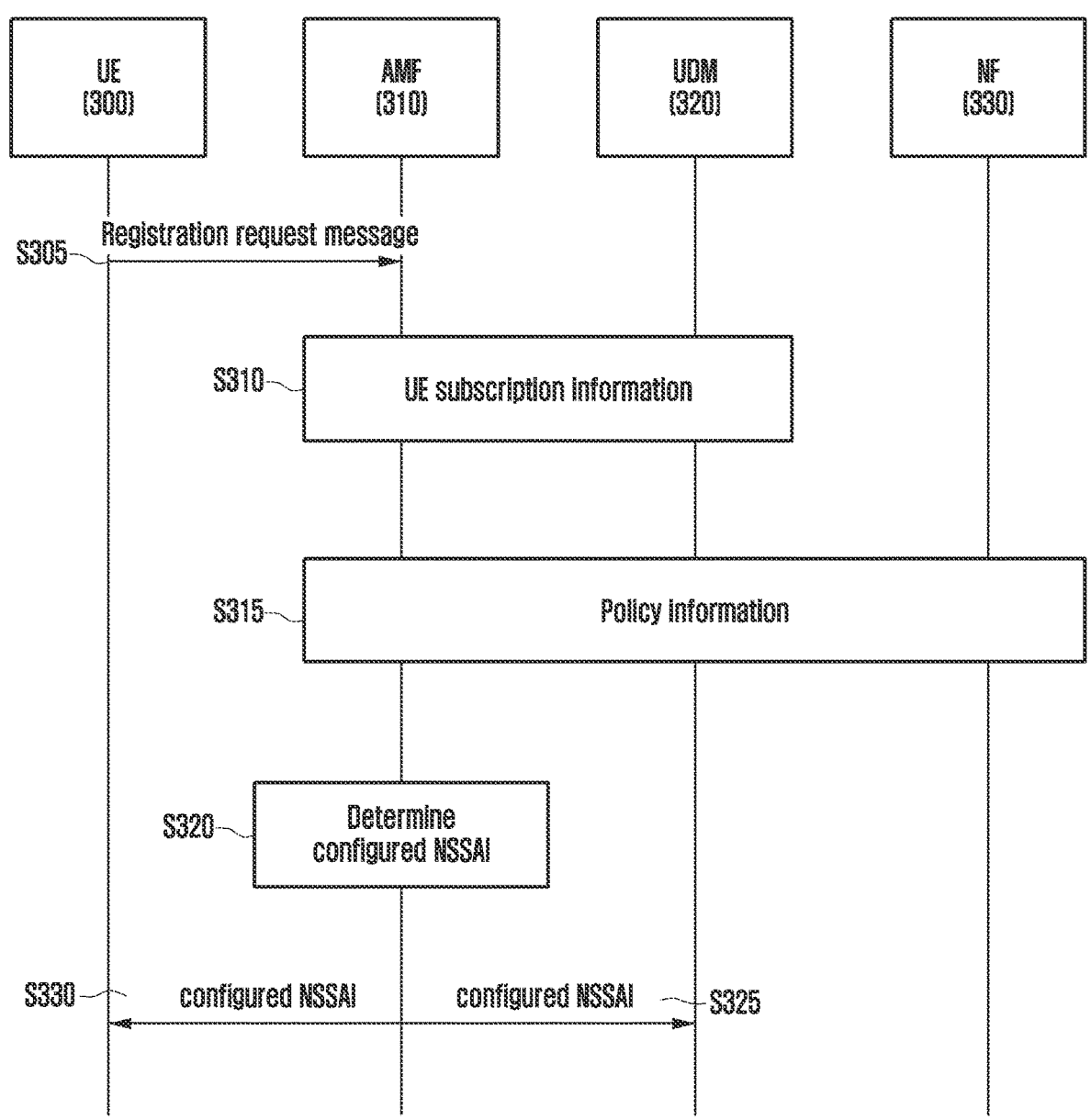
FIG. 3 is a sequence diagram illustrating a method for an access and mobility management function (AMF) to determine configured NSSAI, according to an embodiment of the disclosure.

FIG. 3 is a sequence diagram illustrating a method for an AMF to determine configured NSSAI, according to an embodiment of the disclosure.

Referring to FIG. 3, a mobile communication system may determine a configured NSSAI and configure (transmit) the configured NSSAI to a UE.

An AMF 310 according to an embodiment of the disclosure may determine the configured NSSAI, based on at least one of UE subscription information, operator policy information, and network slice policy information.

At operation S305, the AMF 310 may receive a registration request message from a UE 300.

In order to process the received registration request message, the AMF 310 may acquire UE subscription information at operation S310. For example, the AMF 310 may transmit a message requesting the UE subscription information to a UDM 320 and receive the UE subscription information from the UDM 320. The UE subscription information may include subscribed NSSAI.

The AMF 310 may acquire at least one of operator policy information and network slice related policy information at operation S315. For example, the AMF 310 may transmit a message requesting at least one of the operator policy information and the network slice related policy information to at least one (e.g., PCF, NSSF, etc.) of 5G core network NFs 330, and receive at least one of the operator policy information and the network slice related policy information from the NF 330. Alternatively, for example, at least one of the operator policy information and the network slice related policy information may have been already set and stored in the AMF 310, and the AMF 310 may identify the stored at least one of the operator policy information and the network slice related policy information. The operator policy information or the network slice policy information may include information for determining the configured NSSAI. This information for determining the configured NSSAI may include, for example, at least one of the number of S-NSSAIs (e.g., $2^4$) for constituting the configured NSSAI, an AMF serving area, an AMF load, an S-NSSAI serving area, an S-NSSAI load, and S-NSSAI usage related statistical information.

At operation S320, the AMF 310 may determine the configured NSSAI, based on at least one of the received (or acquired) UE subscription information, operator policy information, and network slice policy information. The configured NSSAI determined by the AMF 310 may include a part of the subscribed NSSAI. For example, if the number of S-NSSAIs constituting the subscribed NSSAI is greater than the number of S-NSSAIs that can constitute the configured NSSAI, the AMF 310 may determine a part of the subscribed NSSAI as the configured NSSAI. In this case, the AMF 310 may allocate at least one of an identifier (or indicator) indicating the configured NSSAI and version information of the configured NSSAI for the determined configured NSSAI. The AMF 310 may store the determined configured NSSAI as a UE context. At this time, at least one of the identifier indicating the configured NSSAI and the version information of the configured NSSAI may be stored as the UE context.

At operation S325, the AMF 310 may transmit the determined configured NSSAI to the UDM 320. At this time, the AMF 310 may transmit at least one of the identifier indicating the configured NSSAI and the version information of the configured NSSAI to the UDM 320 together with the determined configured NSSAI. The UDM 320 may store at least one of the configured NSSAI, the identifier indicating the configured NSSAI, and the version information of the configured NSSAI, received from the AMF 310.

At operation S330, the AMF 310 may transmit the determined configured NSSAI to the UE 300. At this time, the AMF 310 may transmit at least one of the identifier indicating the configured NSSAI and the version information of the configured NSSAI to the UE 300 together with the determined configured NSSAI. A message of the operation S330 may be a registration response (or registration accept) message or a UE configuration update command message. The UE 300 may store at least one of the configured NSSAI, the identifier indicating the configured NSSAI, and the version information of the configured NSSAI, received from the AMF 310. The UE 300 may transmit a response (ACK/NACK) to the AMF 310.

A procedure in which the AMF 310 stores the configured NSSAI as the UE context, a procedure in which the AMF 310 transmits the configured NSSAI to the UDM 320, and a procedure in which the AMF 310 transmits the configured NSSAI to the UE 300, which are described above at the operations S320 to S330, may be performed independently and do not necessarily have to be performed in the order described above.

In addition, the above-described operations are for convenience of description. Depending on the configuration and/or definition in the system, the above-described operations do not have to be necessarily included, and some operations may be omitted.

Figure 4:
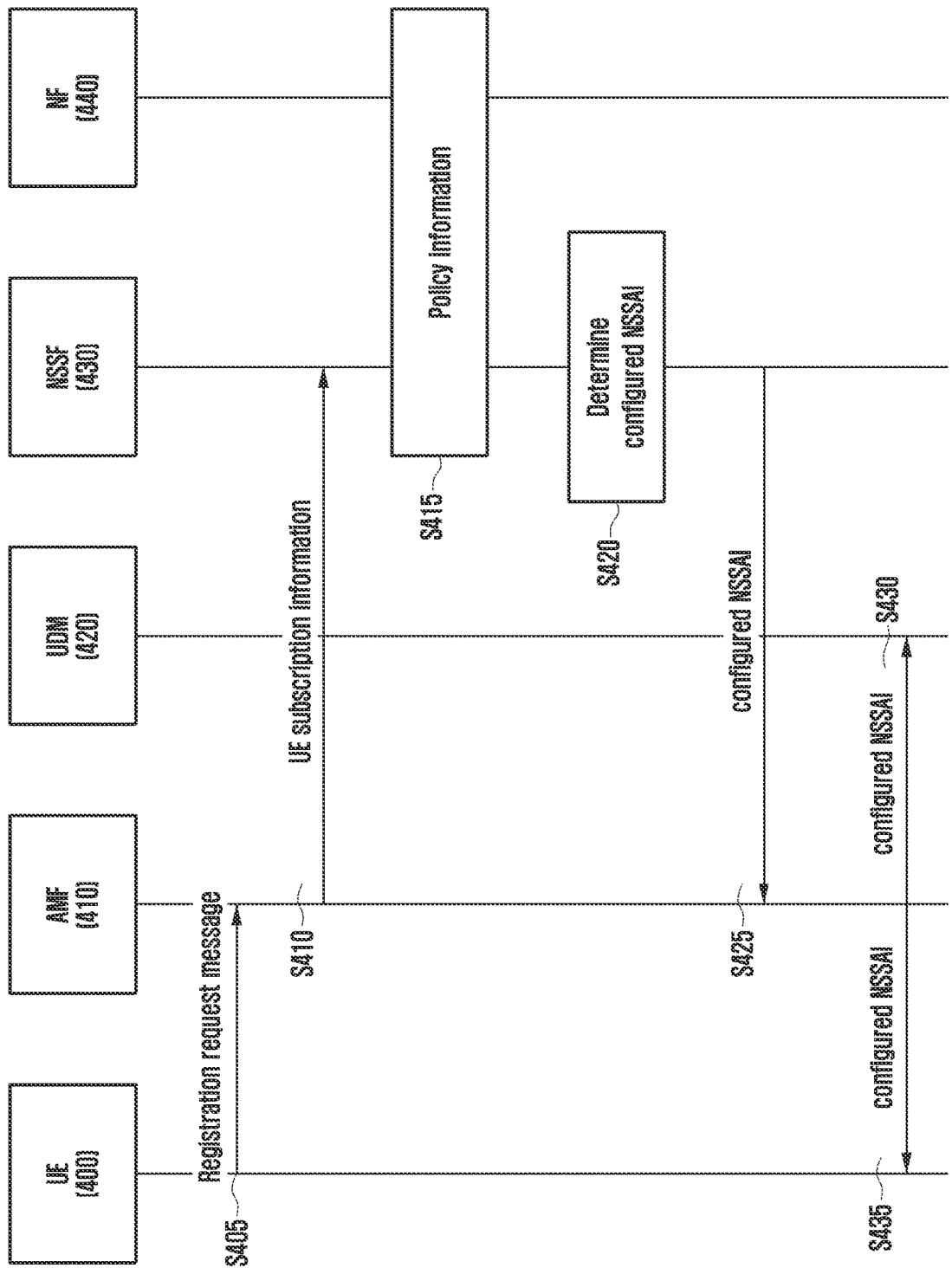
FIG. 4 is a sequence diagram illustrating a method for a network slice selection function (NSSF) to determine configured NSSAI, according to an embodiment of the disclosure.

FIG. 4 is a sequence diagram illustrating a method for an NSSF to determine a configured NSSAI, according to an embodiment of the disclosure.

Referring to FIG. 4, a mobile communication system may determine a configured NSSAI and configure (transmit) the configured NSSAI to a UE.

An NSSF 430 according to an embodiment of the disclosure may determine the configured NSSAI, based on at least one of UE subscription information, operator policy information, and network slice policy information.

At operation S405, an AMF 410 may receive a registration request message from a UE 400.

In order to process the received registration request message, the AMF 410 may transmit a network slice selection message to the NSSF 430 at operation S410. The network slice selection message may include UE subscription information. The UE subscription information may be acquired by the AMF 410 (or received from a UDM 420), and may include subscribed NSSAI.

The NSSF 430 may acquire at least one of operator policy information and network slice related policy information at operation S415. For example, the NS SF 430 may transmit a message requesting at least one of the operator policy information and the network slice related policy information to at least one (e.g., PCF, UDR, etc.) of 5G core network NFs 440, and receive at least one of the operator policy information and the network slice related policy information from the NF 440. Alternatively, for example, at least one of the operator policy information and the network slice related policy information may have been already set and stored in the NS SF 430, and the NS SF 430 may identify the stored at least one of the operator policy information and the network slice related policy information. The operator policy information or the network slice policy information may include information for determining the configured NSSAI. This information for determining the configured NSSAI may include, for example, at least one of the number of S-NSSAIs (e.g., $2^4$) for constituting the configured NSSAI, an AMF serving area, an AMF load, an S-NSSAI serving area, an S-NSSAI load, and S-NSSAI usage related statistical information.

At operation S420, the NSSF 430 may determine the configured NSSAI, based on at least one of the received (or acquired) UE subscription information, operator policy information, and network slice policy information. The configured NSSAI determined by the NS SF 430 may include a part of the subscribed NSSAI. For example, if the number of S-NSSAIs constituting the subscribed NSSAI is greater than the number of S-NSSAIs that can constitute the configured NSSAI, the NSSF 430 may determine a part of the subscribed NSSAI as the configured NSSAI. In this case, the NSSF 430 may allocate at least one of an identifier indicating the configured NSSAI and version information of the configured NSSAI for the determined configured NSSAI.

At operation S425, the NSSF 430 may transmit the determined configured NSSAI to the AMF 410. At this time, the NSSF 430 may transmit at least one of the identifier indicating the configured NSSAI and the version information of the configured NSSAI to the AMF 410 together with the determined configured NSSAI. A message of the operation S425 may be a network slice selection response message. The AMF 410 may identify the configured NSSAI received from the NSSF 430 and store the received configured NSSAI as a UE context. At this time, the identifier indicating the configured NSSAI or the version information of the configured NSSAI may be stored together as the UE context.

At operation S430, the AMF 410 may transmit the configured NSSAI to the UDM 420. At this time, the AMF 410 may transmit at least one of the identifier indicating the configured NSSAI and the version information of the configured NSSAI to the UDM 420 together with the configured NSSAI. The UDM 420 may store at least one of the configured NSSAI, the identifier indicating the configured NSSAI, and the version information of the configured NSSAI, received from the AMF 410.

At operation S435, the AMF 410 may transmit the configured NSSAI to the UE 400. At this time, the AMF 410 may transmit at least one of the identifier indicating the configured NSSAI and the version information of the configured NSSAI to the UE 400 together with the configured NSSAI. A message of the operation S435 may be a registration response (or registration accept) message or a UE configuration update command message. The UE 400 may store at least one of the configured NSSAI, the identifier indicating the configured NSSAI, and the version information of the configured NSSAI, received from the AMF 410. The UE 400 may transmit a response (ACK/NACK) to the AMF 410.

A procedure in which the AMF 410 stores the configured NSSAI as the UE context, a procedure in which the AMF 410 transmits the configured NSSAI to the UDM 420, and a procedure in which the AMF 410 transmits the configured NSSAI to the UE 400, which are described above at the operations S425 to S435, may be performed independently and do not necessarily have to be performed in the order described above.

In addition, the above-described operations are for convenience of description. Depending on the configuration and/or definition in the system, the above-described operations do not have to be necessarily included, and some operations may be omitted.

Figure 5:
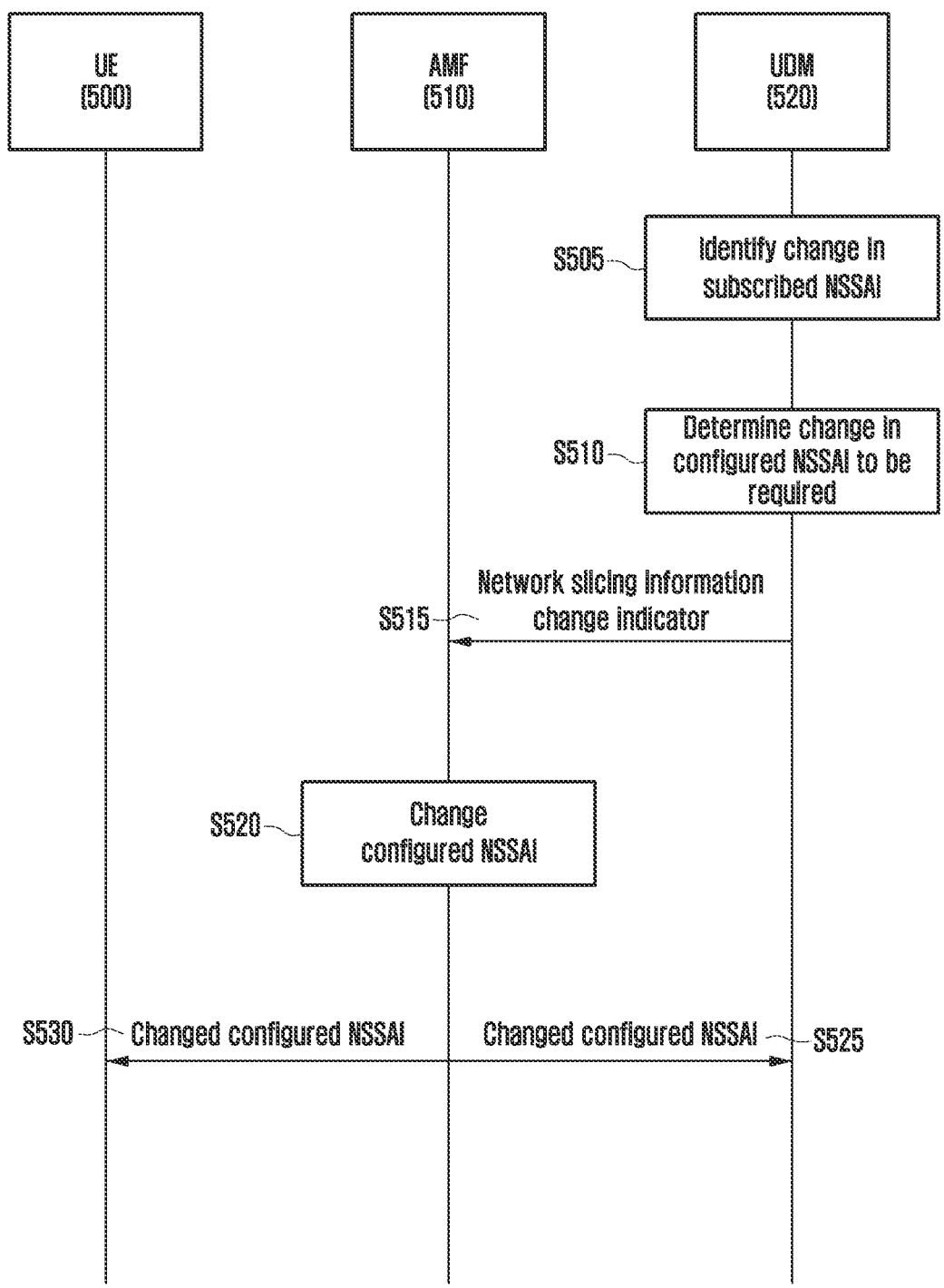
FIG. 5 is a sequence diagram illustrating a method for a unified data management (UDM) to determine a change in configured NSSAI, according to an embodiment of the disclosure.

FIG. 5 is a sequence diagram illustrating a method for a UDM to determine a change in a configured NSSAI, according to an embodiment of the disclosure.

According to an embodiment of the disclosure, a change may occur in the subscribed NSSAI due to a predetermined condition (e.g., UE subscription change, network deployment change, network slice change, etc.).

At operation S505, a UDM 520 may identify that a change occurs in network slicing subscription information (subscribed NSSAI). The UDM 520 may set an indicator (or information) (e.g., a network slicing subscription change indicator) indicating that a change has occurred in the network slicing subscription information (the subscribed NSSAI).

At operation S510, the UDM 520 may determine whether the subscribed NSSAI change affects the configured NSSAI configured in the UE. For example, if a certain S-NSSAI(s) (e.g., S-NSSAI 8) that was included in the subscribed NSSAI has been deleted, the UDM 520 may check whether the S-NSSAI 8 is contained in the configured NSSAI. If the configured NSSAI contains the S-NSSAI 8, the UDM 520 may determine that the subscribed NSSAI change affects the configured NSSAI set in the UE. If the configured NSSAI does not contain the S-NSSAI 8, the UDM 520 may determine that the subscribed NSSAI change does not affect the configured NSSAI configured in the UE. If the subscribed NSSAI change affects the configured NSSAI configured in the UE, the UDM 520 may determine that a change is required in network slicing configuration information (configured NSSAI). The UDM 520 may set information (e.g., a network slicing configuration change indicator) indicating whether a change is required in the network slicing configuration information (the configured NSSAI).

At operation S515, the UDM 520 may transmit a network slicing information change indicator to an AMF 510. The network slicing information change indicator may include at least one of the information (e.g., the network slicing subscription change indicator) indicating that a change has occurred in the network slicing subscription information (the subscribed NSSAI) and the information (e.g., the network slicing configuration change indicator) indicating whether a change is required in the network slicing configuration information (the configured NSSAI). Also, according to an embodiment, information on the S-NSSAI(s) (e.g., S-NSSAI 8) of the configured NSSAI affected by the subscribed NSSAI change may be additionally transmitted to the AMF 510.

At operation S520, the AMF 510 that receives the network slicing information change indicator from the UDM 520 may check whether it is necessary to change the configured NSSAI based on the received network slicing information change indicator, and if a change is required, the AMF 510 may change the configured NSSAI. For example, if the S-NSSAI 8 previously contained in the configured NSSAI is excluded from the subscribed NSSAI, the AMF 510 may exclude the S-NSSAI 8 from the configured NSSAI. In addition, the AMF 510 may newly add, in the configured NSSAI, S-NSSAI(s) that have not yet been contained in the configured NSSAI among the subscribed NSSAI. In this case, the AMF 510 may allocate at least one of an identifier indicating the changed configured NSSAI and version information of the changed configured NSSAI to the changed configured NSSAI. In order to distinguish the changed (updated) configured NSSAI and the previous configured NSSAI, the identifier indicating the changed (new) configured NSSAI may be different from the identifier indicating the previous (old) configured NSSAI. Alternatively, in order to distinguish the changed (updated) configured NSSAI and the previous configured NSSAI, the version information of the changed (new) configured NSSAI may be different from the version information of the previous (old) configured NSSAI. The AMF 510 may store the changed configured NSSAI as a UE context. At this time, at least one of the identifier indicating the changed configured NSSAI and the version information of the changed configured NSSAI may be stored as a changed UE context together with the configured NSSAI. The AMF 510 may delete information related to the previous configured NSSAI (the indicator indicating the previous configured NSSAI and/or the version information of the previous configured NSSAI) from the UE context.

At operation S525, the AMF 510 may transmit the changed configured NSSAI to the UDM 520. At this time, the AMF 510 may transmit at least one of the identifier indicating the changed configured NSSAI and the version information of the changed configured NSSAI to the UDM 520 together with the changed configured NSSAI. The UDM 520 may store at least one of the configured NSSAI, the identifier indicating the configured NSSAI, and the version information of the configured NSSAI, received from the AMF 510. Because the AMF 510 has processed the changed network slicing subscription information (updating the UE configuration information, etc.), the UDM 520 may clear the indicator (the network slicing subscription change indicator) indicating that a change has occurred in the network slicing subscription information (the subscribed NSSAI) stored in the UDM 520.

At operation S530, the AMF 510 may transmit the changed configured NSSAI to the UE 500. At this time, the AMF 510 may transmit at least one of the identifier indicating the changed configured NSSAI and the version information of the changed configured NSSAI to the UE 500 together with the changed configured NSSAI. A message of the operation S530 may be a registration response (or registration accept) message or a UE configuration update command message. The UE 500 may compare at least one of the configured NSSAI, the identifier indicating the configured NSSAI, and the version information of the configured NSSAI, received from the AMF 510, with at least one of the configured NSSAI, the identifier indicating the configured NSSAI, and the version information of the configured NSSAI, stored in the UE. Then, if values are different, the UE 500 may identify that the configured NSSAI has been changed (updated). The UE 500 may store at least one of the received configured NSSAI, the received identifier indicating the configured NSSAI, and the received version information of the configured NSSAI. The UE 500 may transmit a response (ACK/NACK) to the AMF 510.

A procedure in which the AMF 510 stores the configured NSSAI as the UE context, a procedure in which the AMF 510 transmits the configured NSSAI to the UDM 520, and a procedure in which the AMF 510 transmits the configured NSSAI to the UE 500, which are described above at the operations S520 to S530, may be performed independently and do not necessarily have to be performed in the order described above.

In addition, the above-described operations are for convenience of description. Depending on the configuration and/or definition in the system, the above-described operations have to be not necessarily included, and some operations may be omitted.

Figure 6:
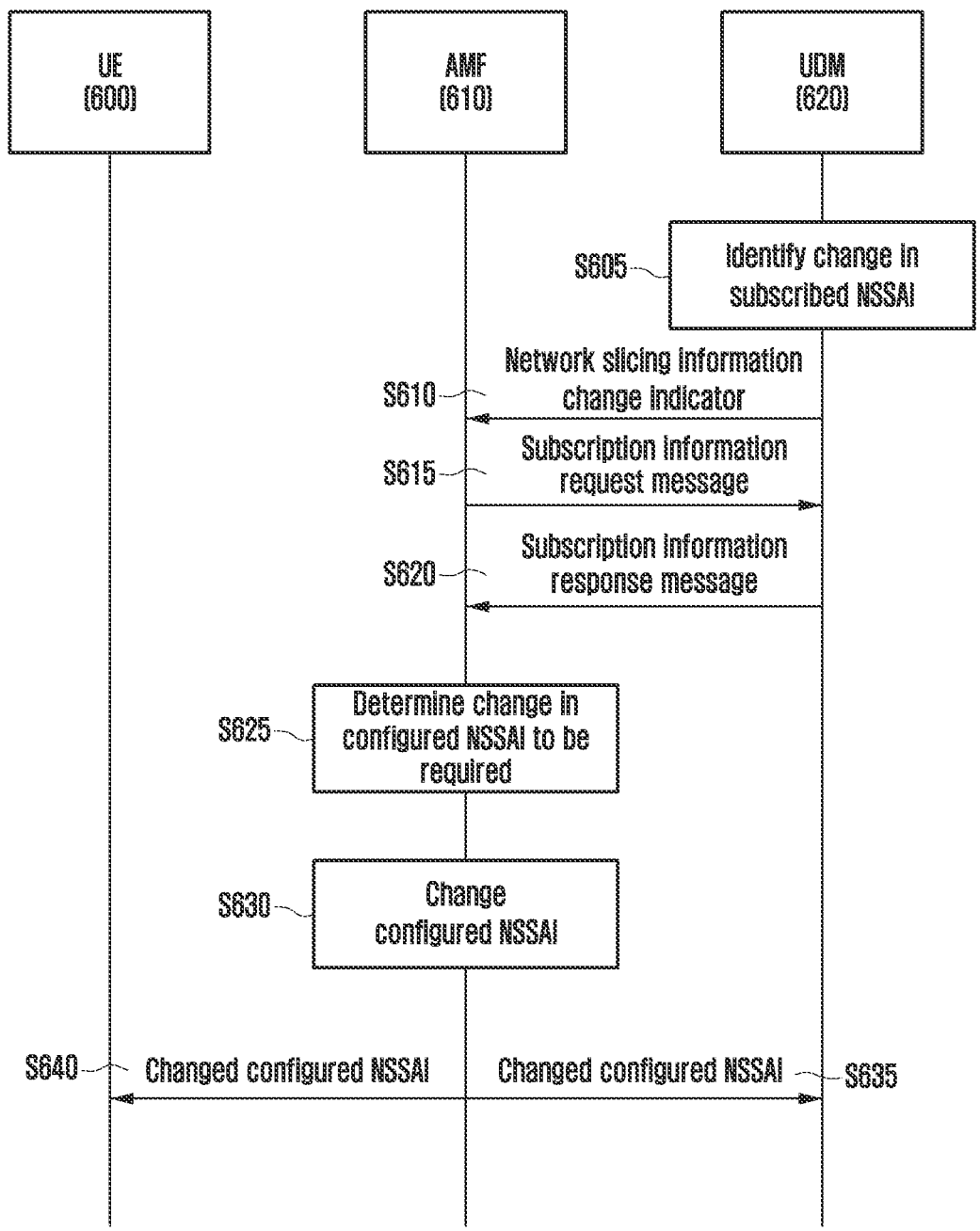
FIG. 6 is a sequence diagram illustrating a method for an AMF to determine a change in configured NSSAI, according to an embodiment of the disclosure.

FIG. 6 is a sequence diagram illustrating a method for an AMF to determine a change in configured NSSAI, according to an embodiment of the disclosure.

According to an embodiment of the disclosure, a change may occur in the subscribed NSSAI due to a predetermined condition (e.g., UE subscription change, network deployment change, network slice change, etc.).

At operation S605, a UDM 620 may identify that a change occurs in network slicing subscription information (subscribed NSSAI). The UDM 620 may set an indicator (or information) (e.g., a network slicing subscription change indicator) indicating that a change has occurred in the network slicing subscription information (the subscribed NSSAI).

At operation S610, the UDM 620 may transmit a network slicing information change indicator to an AMF 610. The network slicing information change indicator may include the indicator (e.g., the network slicing subscription change indicator) indicating that a change has occurred in the network slicing subscription information (the subscribed NSSAI).

At operation S615, the AMF 610 that receives the network slicing information change indicator (e.g., the indicator indicating that a change has occurred in the network slicing subscription information (the subscribed NSSAI)) from the UDM 620 may transmit a UE subscription information request message to the UDM 620.

At operation S620, the UDM 620 that receives the UE subscription information request message may transmit UE subscription information (or a subscription information response message including UE subscription information) to the AMF 610. At this time, the UE subscription information may include changed subscribed NSSAI.

Alternatively, when transmitting the indicator indicating that a change has occurred in the network slicing subscription information (the subscribed NSSAI) to the AMF 610 at the operation S610, the UDM 620 may also transmit the changed subscribed NSSAI. In this case, the above-described operations S615 and S620 may be omitted.

At operation S625, the AMF 610 may determine whether the subscribed NSSAI change affects the configured NSSAI set in the UE. For example, if a certain S-NSSAI(s) (e.g., S-NSSAI 8) that was contained in the subscribed NSSAI has been deleted, the AMF 610 may check whether the S-NSSAI 8 is contained in the configured NSSAI. If the configured NSSAI contains the S-NSSAI 8, the AMF 610 may determine that the subscribed NSSAI change affects the configured NSSAI configured in the UE. If the configured NSSAI does not include the S-NSSAI 8, the AMF 610 may determine that the subscribed NSSAI change does not affect the configured NSSAI configured in the UE. If the subscribed NSSAI change affects the configured NSSAI configured in the UE, the AMF 610 may determine that a change is required in network slicing configuration information (configured NSSAI).

At operation S630, the AMF 610 determining that a change is required in network slicing configuration information (configured NSSAI) may determine (change) the configured NSSAI. For example, if the S-NSSAI 8 included in the configured NSSAI is excluded from the subscribed NSSAI, the AMF 610 may exclude the S-NSSAI 8 from the configured NSSAI. In addition, the AMF 610 may newly add, in the configured NSSAI, S-NSSAI(s) that have not yet been contained in the configured NSSAI among the subscribed NSSAI. In this case, the AMF 610 may allocate at least one of an identifier indicating the changed configured NSSAI and version information of the changed configured NSSAI to the changed configured NSSAI. In order to distinguish the changed (updated) configured NSSAI and the previous configured NSSAI, the identifier indicating the changed (new) configured NSSAI may be different from the identifier indicating the previous (old) configured NSSAI. Alternatively, in order to distinguish the changed (updated) configured NSSAI and the previous configured NSSAI, the version information of the changed (new) configured NSSAI may be different from the version information of the previous (old) configured NSSAI. The AMF 610 may store the changed configured NSSAI as a UE context. At this time, at least one of the identifier indicating the changed configured NSSAI and the version information of the changed configured NSSAI may be stored as a UE context together with the changed configured NSSAI. The AMF 610 may delete information related to the previous configured NSSAI (the indicator indicating the previous configured NSSAI and/or the version information of the previous configured NSSAI) from the UE context.

Although the operations S625 and S630 have been described as separate operations for convenience of description, they may be performed as a single operation.

At operation S635, the AMF 610 may transmit the changed configured NSSAI to the UDM 620. At this time, the AMF 610 may transmit at least one of the identifier indicating the changed configured NSSAI and the version information of the changed configured NSSAI to the UDM 620 together with the changed configured NSSAI. The UDM 620 may store at least one of the configured NSSAI, the identifier indicating the configured NSSAI, and the version information of the configured NSSAI, received from the AMF 610. Because the AMF 610 has processed the changed network slicing subscription information (updating the UE configuration information, etc.), the UDM 620 may clear the indicator (the network slicing subscription change indicator) indicating that a change has occurred in the network slicing subscription information (the subscribed NSSAI) stored in the UDM 620.

At operation S640, the AMF 610 may transmit the changed configured NSSAI to the UE 600. At this time, the AMF 610 may transmit at least one of the identifier indicating the changed configured NSSAI and the version information of the changed configured NSSAI to the UE 600 together with the changed configured NSSAI. A message of the operation S640 may be a registration response (or registration accept) message or a UE configuration update command message. The UE 600 may compare at least one of the configured NSSAI, the identifier indicating the configured NSSAI, and the version information of the configured NSSAI, received from the AMF 610, with at least one of the configured NSSAI, the identifier indicating the configured NSSAI, and the version information of the configured NSSAI, stored in the UE. Then, if values are different, the UE 600 may identify that the configured NSSAI has been changed (updated). The UE 600 may store at least one of the received configured NSSAI, the received identifier indicating the configured NSSAI, and the received version information of the configured NSSAI. The UE 600 may transmit a response (ACK/NACK) to the AMF 610.

A procedure in which the AMF 610 stores the configured NSSAI as the UE context, a procedure in which the AMF 610 transmits the configured NSSAI to the UDM 620, and a procedure in which the AMF 610 transmits the configured NSSAI to the UE 600, which are described above at the operations S630 to S640, may be performed independently and do not necessarily have to be performed in the order described above.

In addition, the above-described operations are for convenience of description. Depending on the configuration and/or definition in the system, the above-described operations do not have to be necessarily included, and some operations may be omitted.

Figure 7:
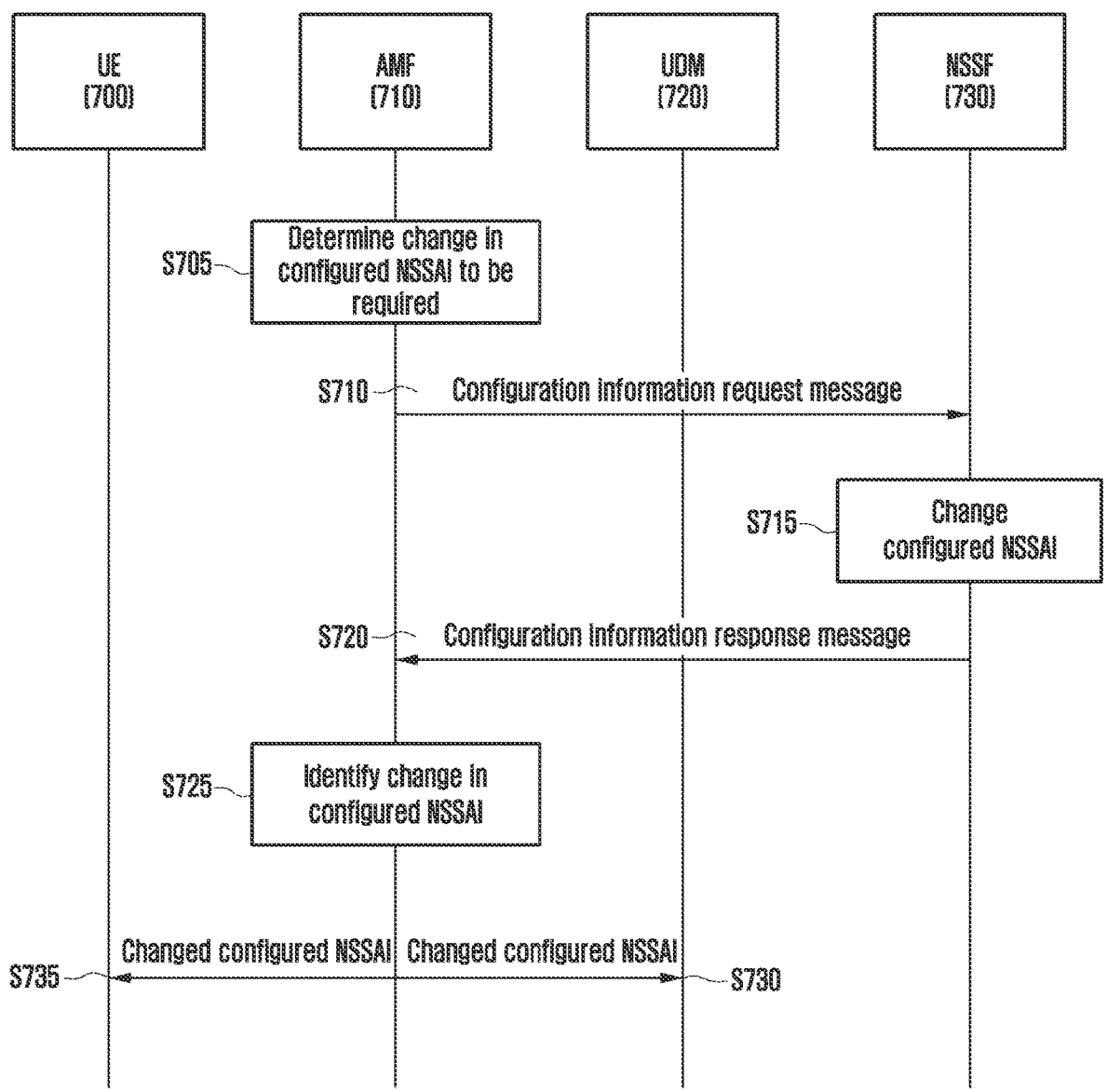
FIG. 7 is a sequence diagram illustrating a method for an NSSF to change configured NSSAI, according to an embodiment of the disclosure.

FIG. 7 is a sequence diagram illustrating a method for an NSSF to change configured NSSAI, according to an embodiment of the disclosure.

At operation S705, an AMF 710 or a UDM 720 may determine (or check) whether a change is required in network slicing configuration information (configured NSSAI). For example, as in the above-described operations S510 to S515, the UDM 720 may determine that a change is required in the network slicing configuration information (the configured NSSAI), and the AMF 710 may receive, from the UDM 720, information indicating whether a change is required in the network slicing configuration information (the configured NSSAI). Based on the received information indicating whether a change is required in the network slicing configuration information (the configured NSSAI), the AMF may determine whether a change of the configured NSSAI is required. Alternatively, for example, as in the above-described operation S625, the AMF 710 may receive from the UDM 720 the indicator indicating that a change has occurred in the network slicing subscription information (the subscribed NSSAI), and determine whether the subscribed NSSAI change affects the configured NSSAI set in the UE.

At operation S710, the AMF 710 may transmit a UE configuration information request message to an NSSF 730. The UE configuration information request message may contain at least one of a changed subscribed NSSAI, a current configured NSSAI, and a UE ID (e.g., a Subscription Permanent Identifier (SUPI), a 5G Globally Unique Temporary Identifier (5G-GUTI), etc.). The message of operation S710 may be a network slice selection message.

At operation S715, the NSSF 730 may determine (change) the configured NSSAI, based on at least one of the changed subscribed NSSAI, the current configured NSSAI, the UE ID, the UE subscription information, the operator policy information, and the network slice policy information. At this time, the NSSF 730 may allocate an identifier indicating the changed configured NSSAI or version information of the changed configured NSSAI to the changed configured NSSAI. The identifier indicating the changed (new) configured NSSAI may be different from the identifier indicating a previous (old) configured NSSAI. The version information of the changed (new) configured NSSAI may be different from version information of the previous (old) configured NSSAI.

At operation S720, the NSSF 730 may transmit the changed configured NSSAI (or a UE configuration information response message including the changed configured NSSAI) to the AMF 710. At this time, the NSSF 730 may transmit at least one of the identifier indicating the changed configured NSSAI and the version information of the changed configured NSSAI to the AMF 710 together with the changed configured NSSAI. The message of operation S720 may be a network slice selection response message.

At operation S725, the AMF 710 may compare at least one of the configured NSSAI, the identifier indicating the configured NSSAI, and the version information of the configured NSSAI, received from the NSSF 730, with at least one of the configured NSSAI, the identifier indicating the configured NSSAI, and the version information of the configured NSSAI, stored as a UE context. Then, if values are different, the AMF 710 may identify that the configured NSSAI has been changed (updated). The AMF 710 may store (update) the configured NSSAI received from the NSSF 730 as the UE context. At this time, the identifier or version information indicating the configured NSSAI may be stored (updated) together as the UE context.

At operation S730, the AMF 710 may transmit the changed configured NSSAI to the UDM 720. At this time, the AMF 710 may transmit at least one of the identifier indicating the changed configured NSSAI and the version information of the changed configured NSSAI to the UDM 720 together with the changed configured NSSAI. The UDM 720 may store (update) the received configured NSSAI. Because the UE configuration information has been updated, the UDM 720 may clear the indicator (the network slicing subscription change indicator) indicating that a change has occurred in the subscribed NSSAI stored in the UDM 720.

At operation S735, the AMF 710 may transmit the changed configured NSSAI to the UE 700. At this time, the AMF 710 may transmit the identifier indicating the changed configured NSSAI or the version information of the changed configured NSSAI to the UE 700 together with the changed configured NSSAI. A message of the operation S735 may be a registration response (or registration accept) message or a UE configuration update command message. The UE 700 may compare at least one of the configured NSSAI, the identifier indicating the configured NSSAI, and the version information of the configured NSSAI, received from the AMF 710, with at least one of the configured NSSAI, the identifier indicating the configured NSSAI, and the version information of the configured NSSAI, stored in the UE. Then, if values are different, the UE 700 may identify that the configured NSSAI has been changed (updated). The UE 700 may store at least one of the received configured NSSAI, the received identifier indicating the configured NSSAI, and the received version information of the configured NSSAI. The UE 700 may transmit a response (ACK/NACK) to the AMF 710.

A procedure in which the AMF 710 stores the configured NSSAI as the UE context, a procedure in which the AMF 710 transmits the configured NSSAI to the UDM 720, and a procedure in which the AMF 710 transmits the configured NSSAI to the UE 700, which are described above at the operations S725 to S735, may be performed independently and do not necessarily have to be performed in the order described above.

In addition, the above-described operations are for convenience of description. Depending on the configuration and/or definition in the system, the above-described operations do not have to be necessarily included, and some operations may be omitted.

Meanwhile, according to an embodiment of the disclosure, although identifying that a change has occurred in the network slicing subscription information (the subscribed NSSAI), the UDM may determine that a change is not required in the network slicing configuration information (the configured NSSAI). For example, the UDM may determine that the subscribed NSSAI change does not affect the configured NSSAI set in the UE.

Alternatively, according to an embodiment of the disclosure, although receiving the indicator indicating that a change has occurred in the network slicing subscription information (the subscribed NSSAI) from the UDM, the AMF may determine that a change is not required in the network slicing configuration information (the configured NSSAI). For example, the AMF may determine that the subscribed NSSAI change does not affect the configured NSSAI configured in the UE. The AMF may reply to the UDM that the changed subscribed NSSAI has been received. At this time, the AMF may also inform the UDM that UE configuration is not required. The UDM may clear the indicator (the network slicing subscription change indicator) indicating that a change has occurred in the network slicing subscription information (the subscribed NSSAI) stored in the UDM.

As such, when it is determined that the network slicing configuration information (the configured NSSAI) does not need to be changed, UE configuration update procedures (the operations S515 to S525, the operations S630 to S640, or the operations S710 to S730) may be omitted.

In addition, the above-described operations are for convenience of description. Depending on the configuration and/or definition in the system, the above-described operations do not have to be necessarily included, and some operations may be omitted.

Figure 8:
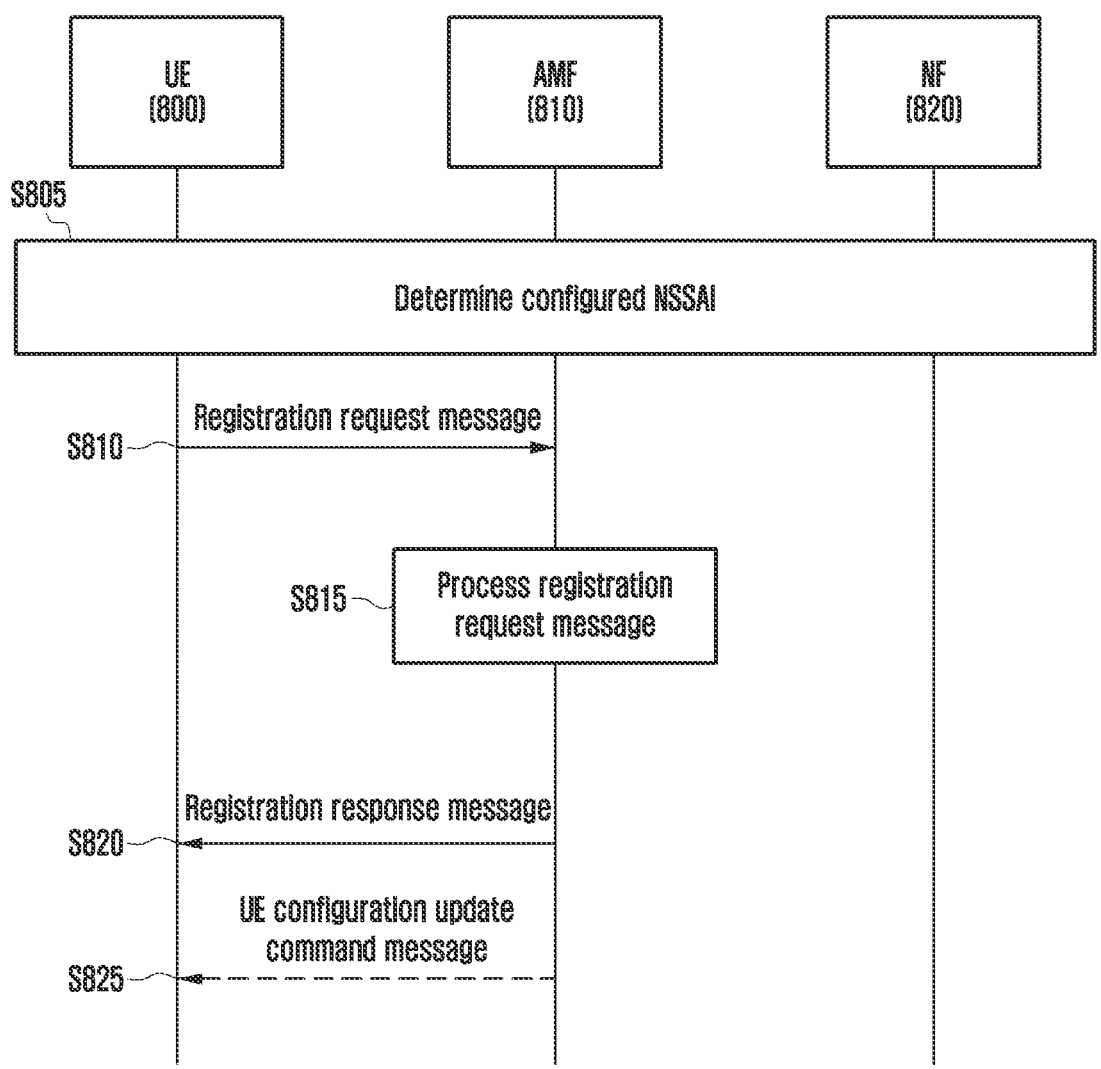
FIG. 8 is a sequence diagram illustrating a method of changing configured NSSAI in a registration procedure of a user equipment (UE), according to an embodiment of the disclosure.

FIG. 8 is a sequence diagram illustrating a method of changing configured NSSAI in a registration procedure of a UE, according to an embodiment of the disclosure.

Referring to FIG. 8, a mobile communication system may determine a changed configured NSSAI and configure (transmit) the changed configured NSSAI to the UE.

At operation S805, a UE 800, an AMF 810, or an NF 820 according to an embodiment of the disclosure may determine or store the configured NSSAI. The NF 820 may be, for example, a UDM or an NSSF. For example, through the above-described procedure (the operations S310 to S330 or the operations S410 to S435) shown in FIG. 3 or FIG. 4, the UE 800 may receive the configured NSSAI from the mobile communication system and store it. In addition, the UE 800 may receive at least one of the identifier indicating the configured NSSAI and the version information of the configured NSSAI from the mobile communication system and store it.

At operation S810, the UE 800 may transmit a registration request message to the AMF 810. The registration request message may contain network slice request information that the UE intends to use, and this will be referred to as requested NSSAI (or requested S-NSSAI(s)) for convenience of explanation. The UE may construct the requested NSSAI, based on the configured NSSAI configured in the UE. The requested NSSAI may include a part or all of the configured NSSAI. Due to limited radio resources, the number of S-NSSAIs constituting the requested NSSAI that the UE can request may be limited. In this case, the number of S-NSSAIs (e.g., $2^3$) constituting the requested NSSAI that the UE can request may be less than the number of S-NSSAIs (e.g., $2^4$) constituting the configured NSSAI stored in the UE. For example, the configured NSSAI and the requested NSSAI may be constructed as follows.

Configured NSSAI:
{S-NSSAI 1, S-NSSAI 2, S-NSSAI 3, S-NSSAI 4, S-NSSAI 5, S-NSSAI 6, S-NSSAI 7, S-NSSAI 8, S-NSSAI 9, S-NSSAI 10, S-NSSAI 11, S-NSSAI 12, S-NSSAI 13, S-NSSAI 14, S-NSSAI 15, S-NSSAI 16}

Requested NSSAI:
{S-NSSAI 1, S-NSSAI 2, S-NSSAI 3, S-NSSAI 4, S-NSSAI 5, S-NSSAI 6, S-NSSAI 7, S-NSSAI 8}

However, this is only an example, and the scope of the disclosure is not limited to the above example.

In addition, the registration request message may contain information related to the configured NSSAI used as a basis for the UE to construct the requested NSSAI. For example, the registration request message may include at least one of the configured NSSAI used as the basis for constructing the requested NSSAI, the identifier indicating the configured NSSAI, and the version information of the configured NSSAI.

At operation S815, the AMF 810 that receives the registration request message from the UE 800 may process the registration request message. In this process, the AMF 810 may determine whether a UE configuration update is required, based on at least one of the requested NSSAI, the configured NSSAI, the identifier indicating the configured NSSAI, the version information of the configured NSSAI, which are received from the UE 800, the UE subscription information received from the UDM, the operator policy information, and the network slice policy information, which are received from another NF of the 5G core network or configured in the AMF. If a UE configuration update is required, the AMF 810 may change (or identify) the configured NSSAI in accordance with the above-described method (or through the NSSF).

At operation S820, the AMF 810 may transmit the changed configured NSSAI to the UE 800. The changed configured NSSAI may be contained in a registration response (or registration accept) message. At this time, the AMF 810 may transmit at least one of the identifier indicating the changed configured NSSAI and the version information of the changed configured NSSAI to the UE 800 together with the changed configured NSSAI.

Alternatively, according to an embodiment, at operation S825, the AMF 810 may add the changed configured NSSAI in a UE configuration message (e.g., a UE configuration update command message) transmitted independently of the registration response message and transmit it to the UE 800. At this time, the AMF 810 may transmit at least one of the identifier indicating the changed configured NSSAI and the version information of the changed configured NSSAI to the UE 800 together with the changed configured NSSAI.

The UE 800 may compare at least one of the configured NSSAI, the identifier indicating the configured NSSAI, and the version information of the configured NSSAI, received from the AMF 810, with at least one of the configured NSSAI, the identifier indicating the configured NSSAI, and the version information of the configured NSSAI, stored in the UE. Then, if values are different, the UE 800 may identify that the configured NSSAI has been changed (updated). The UE 800 may store at least one of the received configured NSSAI, the received identifier indicating the configured NSSAI, and the received version information of the configured NSSAI.

In addition, the above-described operations are for convenience of description. Depending on the configuration and/or definition in the system, the above-described operations do not have to be necessarily included, and some operations may be omitted.

Alternatively, according to another embodiment of the disclosure, the AMF or the NSSF may change the configured NSSAI due to a predetermined condition and/or network situation (e.g., network deployment change, network slice change, network slice load, network slice congestion, network slice quota, change in roaming agreement between HPLMN and VPLMN, etc.). The AMF may configure (transmit) the changed configured NSSAI to the UE. For example, the AMF or the NSSF may change the UE configuration information (e.g., the configured NSSAI) regardless of whether the UE subscription information (e.g., the subscribed NSSAI) is changed. The AMF may transmit the changed configured NSSAI to the UE. The changed configured NSSAI may be contained in the UE configuration update command message. At this time, the AMF may transmit at least one of the identifier and version information indicating the changed configured NSSAI to the UE together with the changed configured NSSAI. The UE may compare at least one of the configured NSSAI, the identifier indicating the configured NSSAI, and the version information of the configured NSSAI, received from the AMF, with at least one of the configured NSSAI, the identifier indicating the configured NSSAI, and the version information of the configured NSSAI, stored in the UE. Then, if values are different, the UE may identify that the configured NSSAI has been changed (updated). The UE may store at least one of the received configured NSSAI, the received identifier indicating the configured NSSAI, and the received version information of the configured NSSAI.

Figure 9:
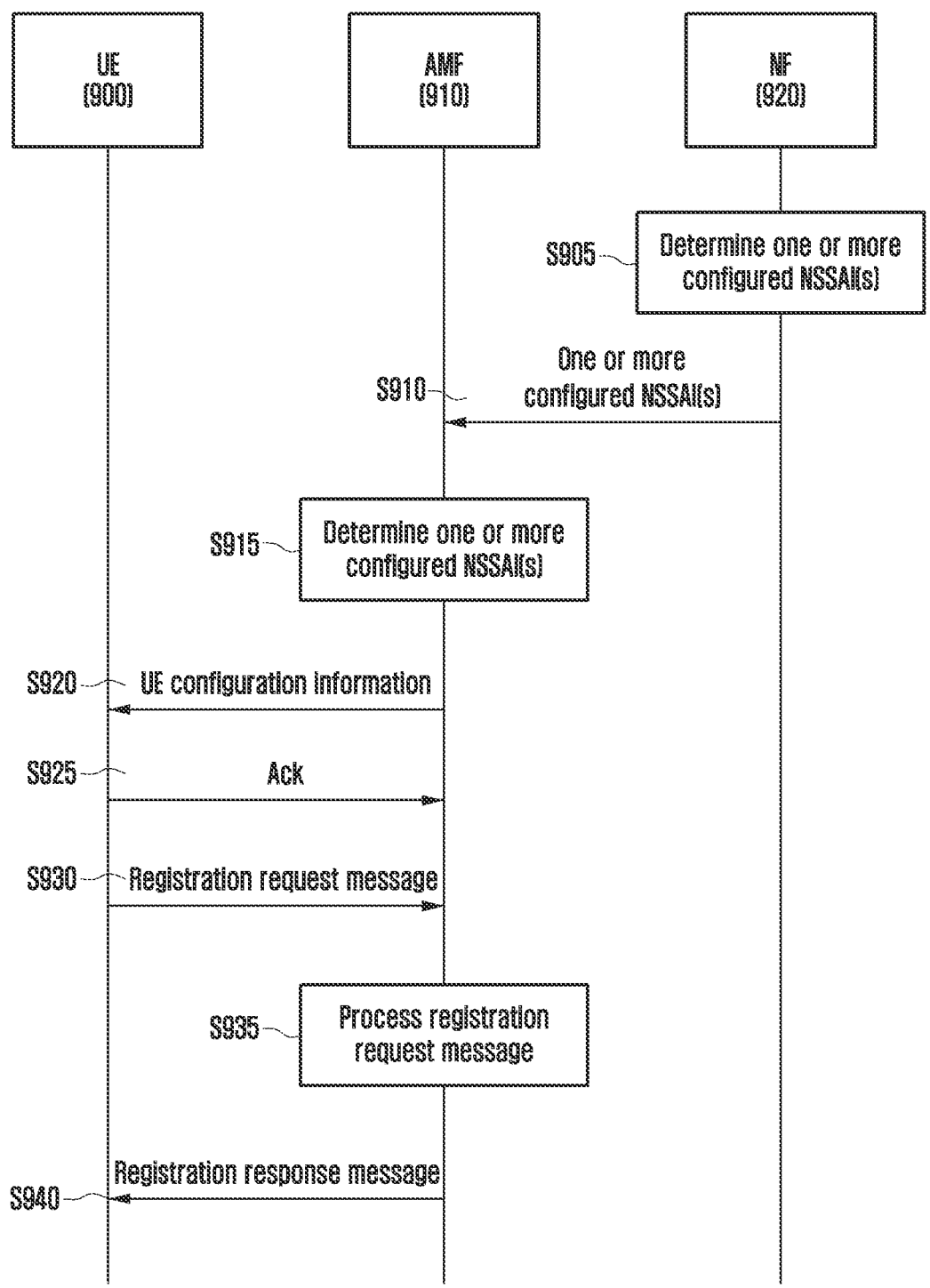
FIG. 9 is a sequence diagram illustrating a method of determining or changing one or more configured NSSAI, according to an embodiment of the disclosure.

FIG. 9 is a sequence diagram illustrating a method of determining or changing one or more configured NSSAI(s), according to an embodiment of the disclosure.

According to another embodiment of the disclosure, the mobile communication system may configure (transmit) one or more configured NSSAI(s) to the UE. Through this method, the mobile communication system may configure all S-NSSAI(s) constituting the subscribed NSSAI to the UE. For example, the subscribed NSSAI and the one or more configured NSSAI(s) may be constructed as follows.

Subscribed NSSAI:
{S-NSSAI 1, S-NSSAI 2, S-NSSAI 3, S-NSSAI 4, S-NSSAI 5, S-NSSAI 6, S-NSSAI 7, S-NSSAI 8, S-NSSAI 9, S-NSSAI 10, S-NSSAI 11, S-NSSAI 12, S-NSSAI 13, S-NSSAI 14, S-NSSAI 15, S-NSSAI 16, S-NSSAI 17, S-NSSAI 18, S-NSSAI 19, S-NSSAI 20}

Configured NSSAI #1:
{S-NSSAI 1, S-NSSAI 2, S-NSSAI 3, S-NSSAI 4, S-NSSAI 5, S-NSSAI 6, S-NSSAI 7, S-NSSAI 8, S-NSSAI 9, S-NSSAI 10, S-NSSAI 11, S-NSSAI 12, S-NSSAI 13, S-NSSAI 14, S-NSSAI 15, S-NSSAI 16}

Configured NSSAI #2:
{S-NSSAI 17, S-NSSAI 18, S-NSSAI 19, S-NSSAI 20}

The mobile communication system may determine one or more configured NSSAI(s) in various ways. For example, the mobile communication system may sequentially construct the configured NSSAIs from the S-NSSAIs constituting the subscribed NSSAI. Alternatively, the mobile communication system may construct one configured NSSAI with simultaneously available network slices (mutually exclusive access to network slices, simultaneous use of the network slices). Each configured NSSAI may be distinguished by an identifier indicating the configured NSSAI or version information of the configured NSSAI.

At operation S905, a 5G core network NF 920 may determine one or more configured NSSAI(s). The NF 920 may be, for example, a PCF, an NSSF, or a UDM. The mobile communication system may determine one or more configured NSSAI(s) similarly to the above-described embodiment.

At operation S910, the NF 920 may transmit the determined one or more configured NSSAI(s) to the AMF 910.

At operation S915, the AMF 910 may identify the received one or more configured NSSAI(s), or the AMF 910 may determine one or more configured NSSAI(s). In case that the AMF 910 determines the one or more configured NSSAI(s), the above-described operations S905 to S910 may be omitted.

At operation S920, the AMF 910 may transmit UE configuration information to the UE 900. The UE configuration information may contain one or more configured NSSAI(s). In addition, the UE configuration information may contain identifier(s) indicating each configured NSSAI or version information of each configured NSSAI. The UE 900 may store at least one of the one or more configured NSSAI(s), the identifier(s) indicating each configured NSSAI, and the version information of each configured NSSAI. The UE configuration information may be contained, for example, in a UE configuration update command message or a registration response (or registration accept) message and transmitted.

At operation S925, the UE 900 may store at least one of the received one or more configured NSSAI(s), the received identifier(s) indicating each configured NSSAI, and the received version information of each configured NSSAI, and transmit a response to the UE configuration information. For example, the UE may transmit a UE configuration update complete message.

At operation S930, the UE 900 may transmit a registration request message to the AMF 910. The registration request message may contain the requested NSSAI, which is network slice request information that the UE intends to use. The UE may construct the requested NSSAI, based on the configured NSSAI configured in the UE. For example, the UE may construct the requested NSSAI, based on one configured NSSAI. In this case, the requested NSSAI may include a part or all of the one configured NSSAI used as a basis. Alternatively, the UE may construct the requested NSSAI, based on one or more configured NSSAI(s). In this case, the requested NSSAI may include a part or all of the one or more configured NSSAI(s) used as a basis. In addition, the registration request message may include information related to the one or more configured NSSAI(s) used as a basis for the UE to construct the requested NSSAI. For example, the registration request message may include at least one of the one or more configured NSSAI(s) used as the basis for constructing the requested NSSAI, the identifier(s) indicating each configured NSSAI, and the version information of each configured NSSAI.

At operation S935, the AMF 910 that receives the registration request message from the UE 900 may process the registration request message. According to an embodiment, the AMF 910 may determine whether a UE configuration update is required, based on at least one of the requested NSSAI, the one or more configured NSSAI(s) used as the basis for constructing the requested NSSAI, the identifier(s) indicating each configured NSSAI, the version information of each configured NSSAI, which are received from the UE 900, the UE subscription information received from the UDM, the operator policy information, and the network slice policy information, which are received from another NF of the 5G core network or configured in the AMF. If a UE configuration update is required, the AMF 910 may change (or identify) the one or more configured NSSAI(s) in accordance with the above-described method (or through the NSSF).

At operation S940, the AMF 910 may transmit the changed one or more configured NSSAI(s) to the UE 900. The changed one or more configured NSSAI(s) may be contained in a registration response (or registration accept) message. At this time, the AMF 910 may transmit at least one of the identifier(s) indicating each changed configured NSSAI and the version information of each changed configured NSSAI to the UE 900 together with the changed one or more configured NSSAI(s). Alternatively, the AMF may add the changed one or more configured NSSAI(s) in a UE configuration message (e.g., a UE configuration update command message) transmitted independently of the registration response message and transmit it to the UE 900.

In addition, the above-described operations are for convenience of description. Depending on the configuration and/or definition in the system, the above-described operations do not have to be necessarily included, and some operations may be omitted.

Figure 10:
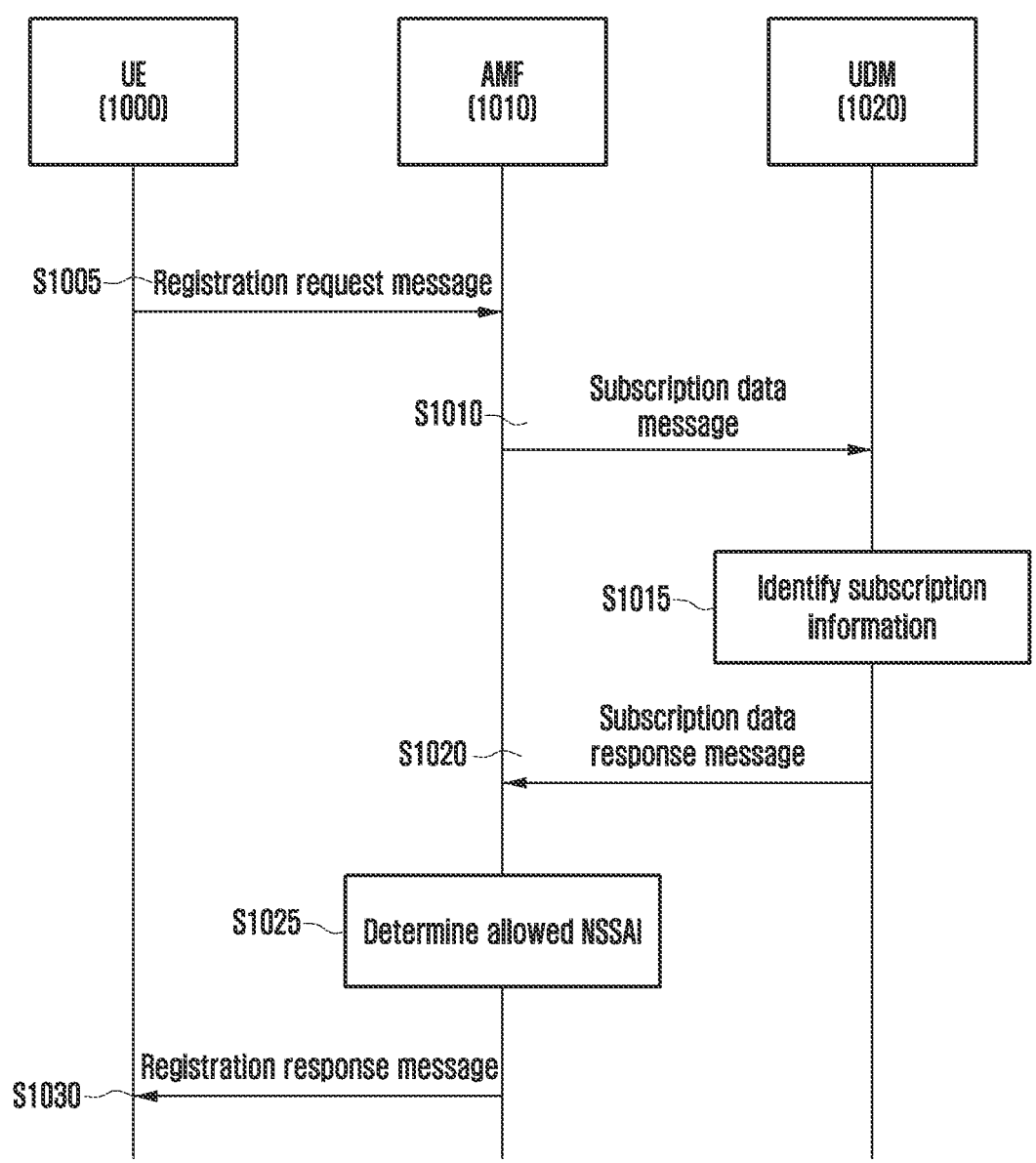
FIG. 10 is a sequence diagram illustrating a method of changing allowed NSSAI in a registration procedure of a UE, according to an embodiment of the disclosure.

FIG. 10 is a sequence diagram illustrating a method of changing allowed NSSAI in a registration procedure of a UE, according to an embodiment of the disclosure.

Referring to FIG. 10, a mobile communication system may determine an allowed NSSAI (or allowed S-NSSAI(s)), which is a network slice allowed for a UE during the registration procedure.

The AMF may construct the allowed NSSAI with S-NSSAI(s) included in the subscribed NSSAI as well among S-NSSAI(s) included in the requested NSSAI which is requested from the UE. In this case, the maximum number of S-NSSAIs of the requested NSSAI may be different from the maximum number of S-NSSAIs of the subscribed NSSAI. For example, the maximum number of S-NSSAIs included in the requested NSSAI may be $2^3$, and the maximum number of S-NSSAIs included in the subscribed NSSAI may be $2^{32}$. This is only an example, and the maximum number of network slices is not limited to the above-described example. In this case, the AMF may have to compare $2^3$ requested S-NSSAIs with $2^{32}$ subscribed S-NSSAIs so as to determine the allowed NSSAI.

Accordingly, the disclosure proposes a method for more efficiently determining the allowed NSSAI.

Referring to FIG. 10, at operation S1005, a UE 1000 may transmit a registration request message to an AMF 1010. The registration request message may include at least one of requested NSSAI, configured NSSAI used as a basis of determining (constructing) the requested NSSAI, an identifier indicating the configured NSSAI, and version information of the configured NSSAI.

At operation S1010, the AMF 1010 may transmit a subscription data request message to a UDM 1020 to process the registration request message. The subscription data request message may include a UE ID (e.g., SUPI, 5G-GUTI, etc.). In addition, the subscription data request message may contain at least one of the requested NSSAI, the configured NSSAI, the identifier indicating the configured NSSAI, and the version information of the configured NSSAI, which are received from the UE.

At operation S1015, the UDM 1020 may identify the subscription information of the UE corresponding to the received UE ID.

According to an embodiment of the disclosure, the UDM 1020 may identify the subscribed NSSAI corresponding to the UE ID. For example, the UDM 1020 that receives the UE ID and the requested NSSAI from the AMF 1010 may identify the subscribed NSSAI corresponding to the UE ID. In addition, the UDM 1020 may determine to transmit partial subscribed NSSAI to the AMF 1010 rather than the entire subscribed NSSAI. For example, the UDM may determine to select only S-NSSAI(s) included in the requested NSSAI from among the subscribed NSSAI and transmit the selected S-NSSAI(s) to the AMF 1010. In this case, the maximum number of S-NSSAIs of the requested NSSAI and the maximum number of S-NSSAIs of the partial subscribed NSSAIs may be equal to each other. For example, the maximum number of S-NSSAI(s) included in the requested NSSAI may be $2^3$, and the maximum number of S-NSSAI(s) included in the partial subscribed NSSAIs may also be $2^3$. This is only an example, and the maximum number of S-NSSAIs is not limited to the above.

Alternatively, according to another embodiment of the disclosure, the UDM 1020 may identify the subscribed NSSAI corresponding to the UE ID. For example, the UDM 1020 that receives the UE ID, the identify indicating the configured NSSAI, or the version information of the configured NSSAI from the AMF 1010 may identify the subscribed NSSAI corresponding to the UE ID. In addition, the UDM 1020 may determine to transmit partial subscribed NSSAI to the AMF 1010 rather than the entire subscribed NSSAI. For example, the UDM may determine to select only S-NSSAI(s) included in the configured NSSAI corresponding to the identifier or version information indicating the configured NSSAI from among the subscribed NSSAI and transmit the selected S-NSSAI(s) to the AMF 1010. In this case, the maximum number of S-NSSAIs of the configured NSSAI and the maximum number of S-NSSAIs of the partial subscribed NSSAIs may be different from each other. For example, the maximum number of S-NSSAI(s) included in the configured NSSAI may be $2^3$, and the maximum number of S-NSSAI(s) included in the partial subscribed NSSAIs may also be $2^4$. This is only an example, and the maximum number of S-NSSAIs is not limited to the above.

At operation S1020, the UDM 1020 may transmit a subscription data response message to the AMF 1010. The subscription data response message may contain the partial subscribed NSSAI selected by the UDM 1020.

At operation S1025, the AMF 1010 may determine the allowed NSSAI, based on the requested NSSAI received from the UE 1000 and the partial subscribed NSSAI received from the UDM 1020. For example, the AMF 1010 may compare S-NSSAI(s) included in the requested NSSAI requested by the UE 1000 with S-NSSAI(s) included in the partial subscribed NSSAI received from the UDM 1020. The AMF 1010 may construct the allowed NSSAI with S-NSSAI(s) included in the partial subscribed NSSAI received from the UDM 1020 from among S-NSSAI(s) included in the requested NSSAI requested by the UE 1000. In addition, the AMF 1010 may construct rejected NSSAI with S-NSSAI(s) not included in the partial subscribed NSSAI received from the UDM 1020 from among S-NSSAI(s) included in the requested NSSAI requested by the UE 1000. In addition, from among S-NSSAI(s) included in the requested NSSAI requested by the UE 1000, the AMF 1010 may construct pending NSSAI with S-NSSAI(s) included in the partial subscribed NSSAI received from the UDM 1020 and also becoming a target of network slice-specific authentication and authorization (NSSAA).

At operation S1030, the AMF 1010 may transmit a registration response (or registration accept) message to the UE 1000. The registration response message may contain the allowed NSSAI. Also, the registration response message may include the rejected NSSAI and/or the pending NSSAI.

In addition, the above-described operations are for convenience of description. Depending on the configuration and/or definition in the system, the above-described operations do not have to be necessarily included, and some operations may be omitted.

Figure 11:
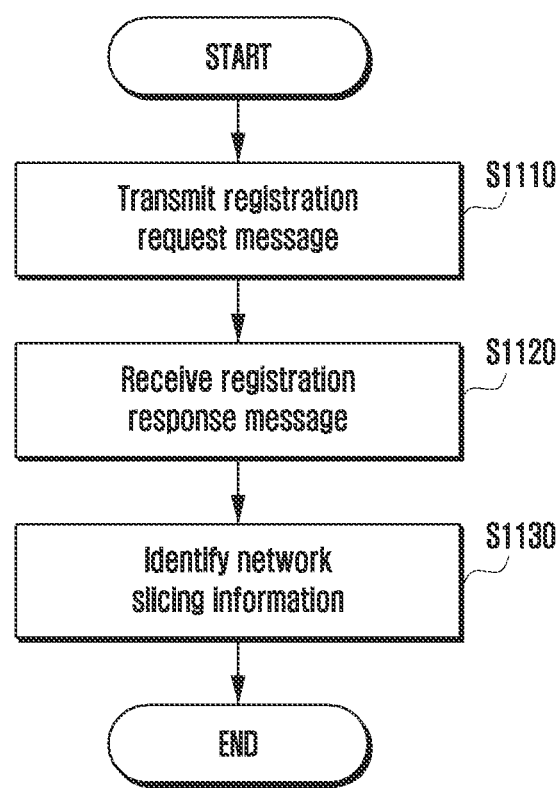
FIG. 11 is a flow diagram illustrating an operation of a UE according to an embodiment of the disclosure.

FIG. 11 is a flow diagram illustrating an operation of a UE according to an embodiment of the disclosure.

Referring to FIG. 11, the UE may perform a series of operations applicable to embodiments proposed in the disclosure.

The UE according to an embodiment of the disclosure may be storing configured NSSAI. The configured NSSAI may have been already stored in the UE or may be configured from the network. For example, the UE may receive UE configuration information including the configured NSSAI from an AMF and store it.

At operation S1110, the UE may transmit a registration request message to the AMF. The registration request message may contain network slice request information (e.g., requested NSSAI) that the UE intends to use. In addition, the registration request message may contain the configured NSSAI used as a basis for the UE to construct the requested NSSAI. For example, the registration request message may contain at least one of the configured NSSAI used as a basis for constructing the requested NSSAI, an identifier indicating the configured NSSAI, and version information of the configured NSSAI.

At operation S1120, the UE may receive a registration response (or registration accept) message from the AMF. The registration response message may contain at least one of the configured NSSAI determined in at least one NF (e.g., an AMF, a UPF, an NSSF, a PCF, etc.), the identifier indicating the configured NSSAI, and the version information of the configured NSSAI. Alternatively, the registration response message may contain at least one of configured NSSAI changed in at least one NF (e.g., the AMF, the UPF, the NSSF, the PCF, etc.), an identifier indicating the changed configured NSSAI, and version information of the changed configured NSSAI. Alternatively, the changed configured NSSAI may be received through a separate message (e.g., UE configuration change command message) transmitted independently of the registration response message.

Alternatively, the registration response message may contain allowed NSSAI allowed for the request of the UE. Also, the registration response message may contain rejected NSSAI for which the use of the UE is rejected and/or pending NSSAI.

At operation S1130, the UE may identify network slicing information. For example, based on the registration response message (or a separate message), the UE may identify and store at least one of the configured NSSAI determined in the at least one NF, the identifier indicating the configured NSSAI, and the version information of the configured NSSAI. Alternatively, based on the registration response message (or a separate message), the UE may identify and store at least one of the configured NSSAI changed in the at least one NF, the identifier indicating the changed configured NSSAI, and the version information of the changed configured NSSAI.

Alternatively, based on the registration response message, the UE may identify and store the allowed NSSAI, rejected NSSAI, or the pending NSSAI, determined in the AMF.

In addition, the above-described operations are for convenience of description. Depending on the configuration and/or definition in the system, the above-described operations do not have to be necessarily included, and some operations may be omitted.

Figure 12:
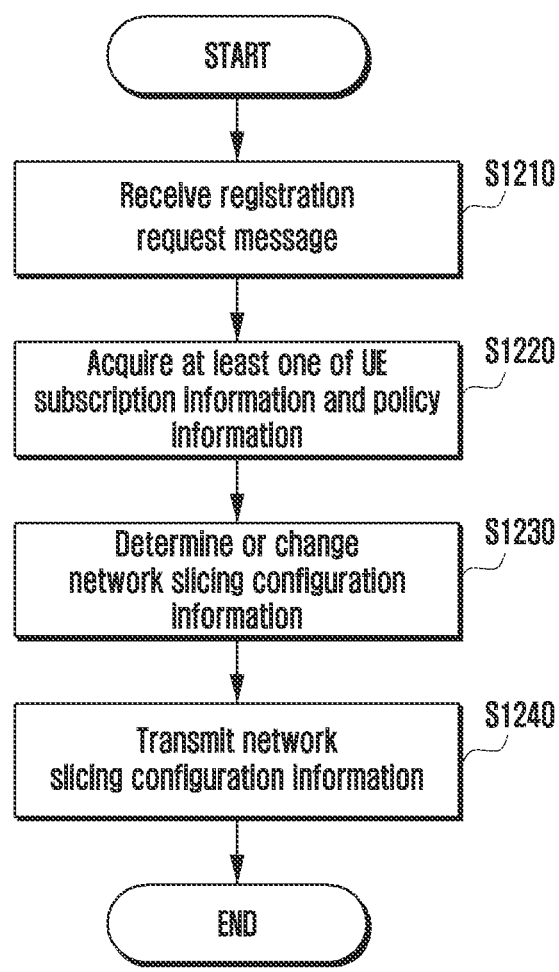
FIG. 12 is a flow diagram illustrating an operation of an AMF according to an embodiment of the disclosure.

FIG. 12 is a flow diagram illustrating an operation of an AMF according to an embodiment of the disclosure.

Referring to FIG. 12, an AMF may perform a series of operations applicable to embodiments proposed in the disclosure.

At operation S1210, the AMF may receive a registration request message from a UE. The registration request message may contain network slice request information (e.g., requested NSSAI) that the UE intends to use. In addition, the registration request message may contain at least one of the configured NSSAI used as a basis for constructing the requested NSSAI, an identifier indicating the configured NSSAI, and version information of the configured NSSAI. Alternatively, the registration request message that does not contain the above-described information may be received.

At operation S1220, the AMF may acquire at least one of UE subscription information and policy information. The AMF may acquire the UE subscription information in order to process the received registration request message. For example, the AMF may transmit a message requesting the UE subscription information to a UDM and receive the UE subscription information from the UDM. The UE subscription information may contain subscribed NSSAI. The AMF may acquire at least one of operator policy information and network slice related policy information. For example, the AMF may transmit a message requesting at least one of the operator policy information and the network slice related policy information to at least one (e.g., a PCF, an NSSF, etc.) of 5G core network NFs, and receive at least one of the operator policy information and the network slice related policy information from the NF. Alternatively, for example, at least one of the operator policy information and the network slice related policy information may have been already set and stored in the AMF, and the AMF may identify the stored at least one of the operator policy information and the network slice related policy information. The operator policy information or the network slice policy information may contain information for determining the configured NSSAI. This information for determining the configured NSSAI may include, for example, at least one of the number of S-NSSAIs (e.g., $2^4$) for constituting the configured NSSAI, an AMF serving area, an AMF load, an S-NSSAI serving area, an S-NSSAI load, and S-NSSAI usage related statistical information.

At operation S1230, the AMF may determine network slicing configuration information. Alternatively, the network slicing configuration information may be changed.

In an embodiment, the AMF may determine a part of the subscribed NSSAI as the configured NSSAI, based on at least one of the UE subscription information, the operator policy information, and the network slice policy information. Alternatively, the AMF may transmit previously stored UE subscription information or UE subscription information received from the UDM to the NSSF, and receive the configured NSSAI determined by the NS SF based on at least one of the UE subscription information, the operator policy information, and the network slice policy information. The AMF may determine (or identify) and store the configured NSSAI received from the NSSF.

The AMF may allocate at least one of an identifier (or indicator) indicating the configured NSSAI and version information of the configured NSSAI for the determined (or identified) configured NSSAI. The AMF may store the determined configured NSSAI as a UE context. At this time, the identifier or version information indicating the configured NSSAI may be stored together as the UE context. The AMF may transmit the determined configured NSSAI to at least one of the UE and the UDM. The determined configured NSSAI may contain at least one of the configured NSSAI, the identifier indicating the configured NSSAI, and the version information of the configured NSSAI.

In an embodiment, the AMF may change the configured NSSAI (or identify the changed configured NSSAI). The subscribed NSSAI may be changed due to a predetermined condition (e.g., UE subscription change, network deployment change, network slice change, etc.). The AMF may receive a network slicing information change indicator from the UDM. The network slicing information change indicator may include at least one of information (e.g., a network slicing subscription change indicator) indicating that a change has occurred in network slicing subscription information (the subscribed NSSAI) and information (e.g., a network slicing configuration change indicator) indicating whether a change is required in network slicing configuration information (the configured NSSAI). In addition, the AMF may additionally receive information about S-NSSAI(s) of the configured NSSAI affected by a change in the subscribed NSSAI. The AMF may change the configured NSSAI, based on the information received from the UDM. For example, if a certain S-NSSAI(s) included in the previous configured NSSAI is excluded from the subscribed NSSAI, the AMF may exclude the corresponding S-NSSAI(s) from the configured NSSAI. In addition, the AMF may newly add, in the configured NSSAI, S-NSSAI(s) that have not yet been contained in the configured NSSAI among the subscribed NSSAI.

Alternatively, in an embodiment, the subscribed NSSAI may be changed due to a predetermined condition (e.g., UE subscription change, network deployment change, network slice change, etc.). The AMF may receive a network slicing information change indicator from the UDM. The network slicing information change indicator may include an indicator (e.g., a network slicing subscription change indicator) indicating that a change has occurred in network slicing subscription information (the subscribed NSSAI). The AMF may request UE subscription information from the UDM and receive the UE subscription information from the UDM. The UE subscription information may include the changed subscribed NSSAI. Alternatively, when transmitting to the AMF the indicator indicating that a change has occurred in the network slicing subscription information (the subscribed NSSAI), the UDM may also transmit the changed subscribed NSSAI. In this case, the above-described request and reception of the UE subscription information may be omitted. The AMF may determine that a change is required in the configured NSSAI, based on whether a change in the subscribed NSSAI affects the configured NSSAI configured in the UE. The AMF determining that a change is required in the configured NSSAI may change the configured NSSAI. For example, if a certain S-NSSAI(s) included in the previous configured NSSAI is excluded from the subscribed NSSAI, the AMF may exclude the corresponding S-NSSAI(s) from the configured NSSAI. In addition, the AMF may newly add, in the configured NSSAI, S-NSSAI(s) that have not yet been contained in the configured NSSAI among the subscribed NSSAI.

Alternatively, in an embodiment, the AMF that determines (or identifies) whether a change is required in the network slicing configuration information (the configured NSSAI) may transmit a UE configuration information request message to the NSSF. The UE configuration information request message may contain at least one of a changed subscribed NSSAI, a current configured NSSAI, and a UE ID. The NSSF may determine (change) the configured NSSAI, based on at least one of the changed subscribed NSSAI, the current configured NSSAI, the UE ID, the UE subscription information, the operator policy information, and the network slice policy information. At this time, the NSSF may allocate an identifier indicating the changed configured NSSAI or version information of the changed configured NSSAI to the changed configured NSSAI. The identifier indicating the changed configured NSSAI may be different from the identifier indicating the previous configured NSSAI. The version information of the changed configured NSSAI may be different from the version information of the previous configured NSSAI. The AMF may receive the changed configured NSSAI (or a UE configuration information response message including the changed configured NSSAI) from the NSSF. At this time, the AMF may receive at least one of the identifier indicating the changed configured NSSAI and the version information of the changed configured NSSAI from the NSSF together with the changed configured NSSAI. The AMF may identify and store the changed configured NSSAI received from the NSSF.

Alternatively, in an embodiment, the AMF may determine whether a UE configuration update is required, based on at least one of the requested NSSAI, the configured NSSAI, the identifier indicating the configured NSSAI, the version information of the configured NSSAI, which are received in the registration request message, the UE subscription information received (or previously stored) from the UDM, the operator policy information, and the network slice policy information, which are received (or previously stored) from at least one NF. If a UE configuration update is required, the AMF may change (or identify) the configured NSSAI in accordance with the above-described method (or through the NSSF).

Alternatively, according to an embodiment, the AMF may change the configured NSSAI due to a predetermined condition and/or network situation (e.g., network deployment change, network slice change, network slice load, network slice congestion, network slice quota, change in roaming agreement between HPLMN and VPLMN, etc.). For example, the AMF may change the UE configuration information (e.g., the configured NSSAI) regardless of whether the UE subscription information (e.g., the subscribed NSSAI) is changed.

At operation S1240, the AMF may allocate at least one of the identifier indicating the changed configured NSSAI and the version information of the changed configured NSSAI for the changed (or the change is identified) configured NSSAI. The AMF may store the changed configured NSSAI as a UE context. At this time, the identifier or version information indicating the changed configured NSSAI may be stored together as the UE context. The AMF may transmit network slicing configuration information including at least one of the changed configured NSSAI, the identifier indicating the changed configured NSSAI, and the version information of the changed configured NSSAI to at least one of the UE and the UDM.

In addition, the above-described operations are for convenience of description. Depending on the configuration and/or definition in the system, the above-described operations do not have to be necessarily included, and some operations may be omitted.

Figure 13:
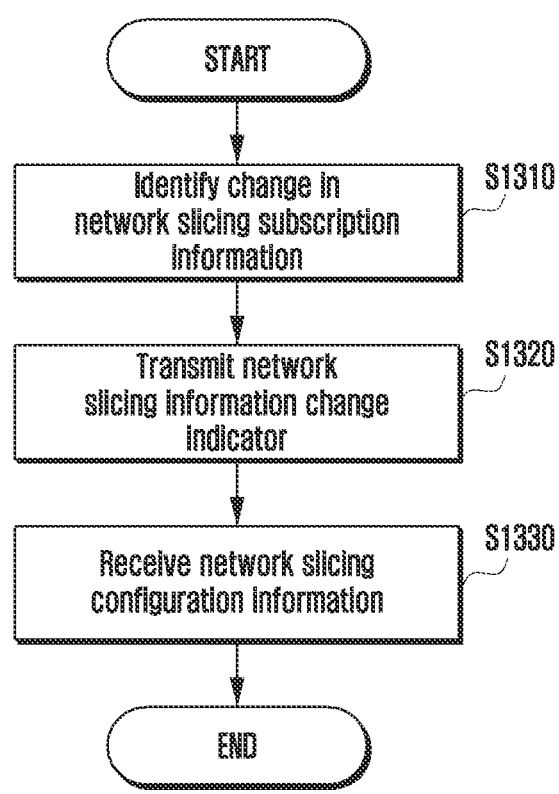
FIG. 13 is a flow diagram illustrating an operation of a UDM according to an embodiment of the disclosure.

FIG. 13 is a flow diagram illustrating an operation of a UDM according to an embodiment of the disclosure.

Referring to FIG. 13, a UDM may perform a series of operations applicable to embodiments proposed in the disclosure.

At operation S1310, the UDM may identify that a change occurs in subscribed NSSAI due to a predetermined condition (e.g., UE subscription change, network deployment change, network slice change, etc.). The UDM may set an indicator (or information) (e.g., a network slicing subscription change indicator) indicating that a change has occurred in network slicing subscription information (the subscribed NSSAI). In addition, the UDM may determine whether the subscribed NSSAI change affects the configured NSSAI configured in the UE. For example, if a certain S-NSSAI(s) (e.g., S-NSSAI 8) that was contained in the subscribed NSSAI has been deleted, the UDM may check whether the S-NSSAI 8 is contained in the configured NSSAI. If the configured NSSAI contains the S-NSSAI 8, the UDM may determine that the subscribed NSSAI change affects the configured NSSAI configured in the UE. If the configured NSSAI does not contain the S-NSSAI 8, the UDM may determine that the subscribed NSSAI change does not affect the configured NSSAI set in the UE. If the subscribed NSSAI change affects the configured NSSAI set in the UE, the UDM may determine that a change is required in network slicing configuration information (configured NSSAI). The UDM may set information (e.g., a network slicing configuration change indicator) indicating whether a change is required in the network slicing configuration information (the configured NSSAI).

At operation S1320, the UDM may transmit a network slicing information change indicator to an AMF. The network slicing information change indicator may include at least one of the information (e.g., the network slicing subscription change indicator) indicating that a change has occurred in the network slicing subscription information (the subscribed NSSAI) and the information (e.g., the network slicing configuration change indicator) indicating whether a change is required in the network slicing configuration information (the configured NSSAI). Also, according to an embodiment, information on the S-NSSAI(s) (e.g., S-NSSAI 8) of the configured NSSAI affected by the subscribed NSSAI change may be additionally transmitted to the AMF.

At operation S1330, the UDM may receive the network slicing configuration information from the AMF. The network slicing configuration information may include at least one of configured NSSAI changed based on the network slicing information change indicator transmitted by the UDM, an identifier indicating the changed configured NSSAI, and version information of the changed configured NSSAI. The UDM may store at least one of the configured NSSAI, the identifier indicating the configured NSSAI, and the version information of the configured NSSAI, received from the AMF. Because the AMF has processed the changed network slicing subscription information (updating the UE configuration information, etc.), the UDM may clear the indicator (the network slicing subscription change indicator) indicating that a change has occurred in the stored network slicing subscription information (the subscribed NSSAI).

In addition, the above-described operations are for convenience of description. Depending on the configuration and/or definition in the system, the above-described operations do not have to be necessarily included, and some operations may be omitted.

Figure 14:
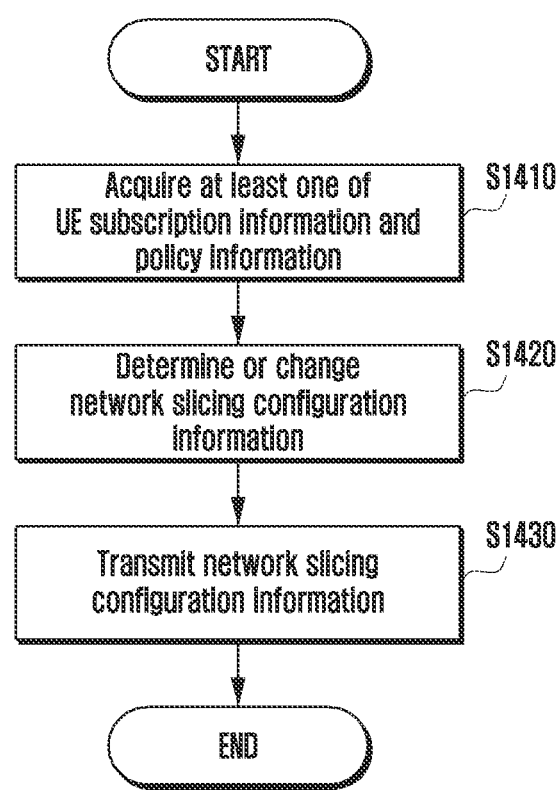
FIG. 14 is a flow diagram illustrating an operation of a network function (NF) according to an embodiment of the disclosure.

FIG. 14 is a flow diagram illustrating an operation of an NF according to an embodiment of the disclosure.

Referring to FIG. 14, a NF may perform a series of operations applicable to embodiments proposed in the disclosure. The NF may be, for example, an NSSF.

At operation S1410, the NF may acquire at least one of UE subscription information and policy information. For example, the NF may receive the UE subscription information that an AMF receives from a UDM and transmits. The UE subscription information may include subscribed NSSAI. The NF may acquire at least one of operator policy information and network slice related policy information. For example, the NF may transmit a message requesting at least one of the operator policy information and the network slice related policy information to at least one (e.g., a PCF, etc.) of other 5G core network NFs, and receive at least one of the operator policy information and the network slice related policy information. Alternatively, for example, at least one of the operator policy information and the network slice related policy information may have been already set and stored in the NF, and the NF may identify the stored at least one of the operator policy information and the network slice related policy information. The operator policy information or the network slice policy information may include information for determining the configured NSSAI. This information for determining the configured NSSAI may include, for example, at least one of the number of S-NSSAIs (e.g., $2^4$) for constituting the configured NSSAI, an AMF serving area, an AMF load, an S-NSSAI serving area, an S-NSSAI load, and S-NSSAI usage related statistical information.

At operation S1420, the NF may determine network slicing configuration information. Alternatively, the NF may change the network slicing configuration information.

In an embodiment, the NF may determine a part of the subscribed NSSAI as the configured NSSAI, based on at least one of the UE subscription information, the operator policy information, and the network slice policy information. At this time, the NF may allocate at least one of an identifier indicating the configured NSSAI and version information of the configured NSSAI for the determined configured NSSAI.

Alternatively, in an embodiment, the NF may receive a UE configuration information request message from the AMF. The UE configuration information request message may include at least one of a changed subscribed NSSAI, a current configured NSSAI, and a UE ID (e.g., a Subscription Permanent Identifier (SUPI), a 5G Globally Unique Temporary Identifier (5G-GUTI), etc.). This message may be a network slice selection message. The NF may change the configured NSSAI, based on at least one of the changed subscribed NSSAI, the current configured NSSAI, the UE ID, the UE subscription information, the operator policy information, and the network slice policy information. At this time, the NF may allocate an identifier indicating the changed configured NSSAI or version information of the changed configured NSSAI to the changed configured NSSAI. The identifier indicating the changed (new) configured NSSAI may be different from an identifier indicating a previous (old) configured NSSAI. The version information of the changed (new) configured NSSAI may be different from version information of the previous (old) configured NSSAI.

At operation S1430, the NF may transmit network slicing configuration information that contains at least one of the changed configured NSSAI, the identifier indicating the changed configured NSSAI, and the version information of the changed configured NSSAI to the AMF.

In addition, the above-described operations are for convenience of description. Depending on the configuration and/or definition in the system, the above-described operations do not have to be necessarily included, and some operations may be omitted.

Figure 15:
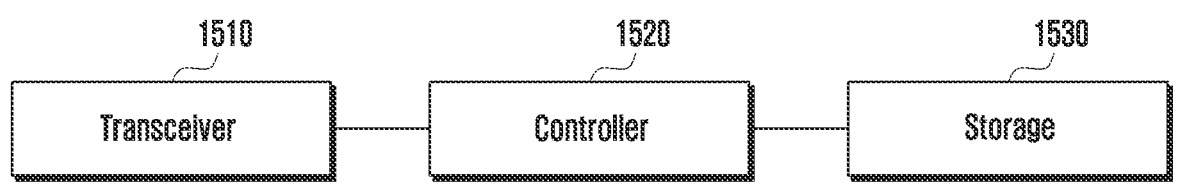
FIG. 15 is a diagram illustrating a structure of a UE according to an embodiment of the disclosure.

FIG. 15 is a diagram illustrating a structure of a UE according to an embodiment of the disclosure.

Referring to FIG. 15, a UE may include a transceiver 1510, a controller 1520, and a storage 1530. In the disclosure, the controller may be defined as a circuit, an application-specific integrated circuit, or at least one processor.

The transceiver 1510 may transmit/receive a signal, information, a control message, etc. to/from other network entity. For example, the transceiver 1510 may receive system information from a base station and receive a synchronization signal or a reference signal. For example, the transceiver 1510 may transmit a registration request message to an AMF and receive a registration response message from the AMF.

The controller 1520 may control the overall operation of the UE according to embodiments proposed in the disclosure. For example, the controller 1520 may control a signal flow between blocks to perform operations according to the above-described flow diagrams. Specifically, the controller 1520 may control operations proposed in the disclosure to efficiently provide network slicing according to embodiments of the disclosure. The controller 1520 may control the transceiver 1510 to transmit/receive a signal, information, a control message, etc. to/from other network entity according to embodiments of the disclosure.

The storage 1530 may store at least one of information transmitted/received through the transceiver 1510 and information generated through the controller 1520. For example, the storage 1530 may have stored network slicing configuration information or may store network slicing configuration information received from the AMF.

Figure 16:
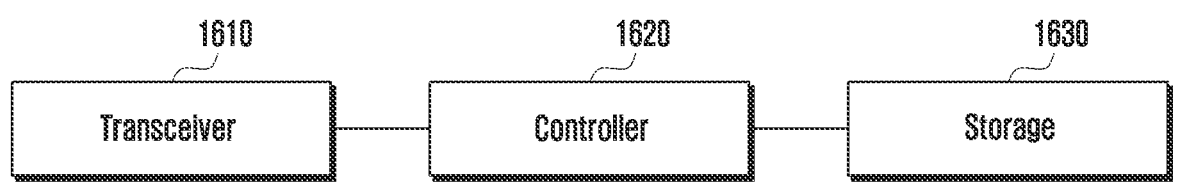
FIG. 16 is a diagram illustrating a structure of an AMF according to an embodiment of the disclosure.

FIG. 16 is a diagram illustrating a structure of an AMF according to an embodiment of the disclosure.

Referring to FIG. 16, an AMF may include a transceiver 1610, a controller 1620, and a storage 1630. In the disclosure, the controller may be defined as a circuit, an application-specific integrated circuit, or at least one processor.

The transceiver 1610 may transmit/receive a signal, information, a control message, etc. to/from other network entity. For example, the transceiver 1610 may transmit/receive a signal, information, a control message, etc. to/from a UE or other core network entity (e.g., a UDM, a PCF, an NSSF, etc.). For example, the transceiver 1610 may receive a registration request message from the UE and transmit a registration response message to the UE. For example, the transceiver 1610 may receive network slicing subscription information from the UDM.

The controller 1620 may control the overall operation of the AMF according to embodiments proposed in the disclosure. For example, the controller 1620 may control a signal flow between blocks to perform operations according to the above-described flow diagrams. Specifically, the controller 1620 may control operations proposed in the disclosure to efficiently provide network slicing according to embodiments of the disclosure. The controller 1620 may control the transceiver 1610 to transmit/receive a signal, information, a control message, etc. to/from other network entity according to embodiments of the disclosure.

The storage 1630 may store at least one of information transmitted/received through the transceiver 1610 and information generated through the controller 1620. For example, the storage 1630 may store network slicing configuration information or network slicing subscription information.

Figure 17:
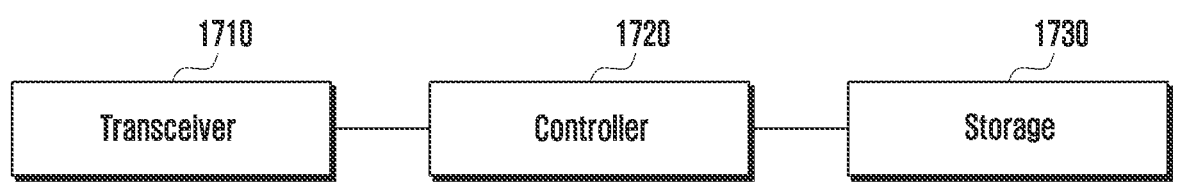
FIG. 17 is a diagram illustrating a structure of a UDM according to an embodiment of the disclosure.

FIG. 17 is a diagram illustrating a structure of a UDM according to an embodiment of the disclosure.

Referring to FIG. 17, a UDM may include a transceiver 1710, a controller 1720, and a storage 1730. In the disclosure, the controller may be defined as a circuit, an application-specific integrated circuit, or at least one processor.

The transceiver 1710 may transmit/receive a signal, information, a control message, etc. to/from other network entity. For example, the transceiver 1710 may transmit/receive a control message to/from other core network entity (e.g., an AMF, a PCF, an NSSF, etc.). For example, the transceiver 1710 may transmit UE subscription information to the AMF.

The controller 1720 may control the overall operation of the UDM according to embodiments proposed in the disclosure. For example, the controller 1720 may control a signal flow between blocks to perform operations according to the above-described flow diagrams. Specifically, the controller 1720 may control operations proposed in the disclosure to efficiently provide network slicing according to embodiments of the disclosure. The controller 1720 may control the transceiver 1710 to transmit/receive a signal, information, a control message, etc. to/from other network entity according to embodiments of the disclosure.

The storage 1730 may store at least one of information transmitted/received through the transceiver 1710 and information generated through the controller 1720. For example, the storage 1730 may store network slicing configuration information or network slicing subscription information.

Figure 18:
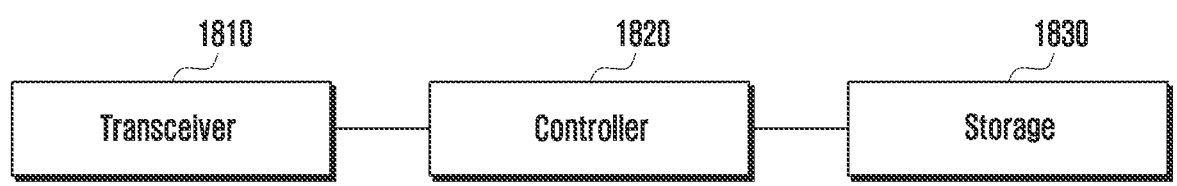
FIG. 18 is a diagram illustrating a structure of a network function (NF) according to an embodiment of the disclosure.

FIG. 18 is a diagram illustrating a structure of an NF according to an embodiment of the disclosure.

Referring to FIG. 18, a NF may include a transceiver 1810, a controller 1820, and a storage 1830. In the disclosure, the controller may be defined as a circuit, an application-specific integrated circuit, or at least one processor. The NF may be, for example, an NSSF.

The transceiver 1810 may transmit/receive a signal, information, a control message, etc. to/from other network entity. For example, the transceiver 1810 may transmit/receive a control message to/from other core network entity (e.g., an AMF, a PCF, an NSSF, etc.). For example, the transceiver 1810 may transmit/receive network slicing configuration information to/from the AMF.

The controller 1820 may control the overall operation of the NF according to embodiments proposed in the disclosure. For example, the controller 1820 may control a signal flow between blocks to perform operations according to the above-described flow diagrams. Specifically, the controller 1820 may control operations proposed in the disclosure to efficiently provide network slicing according to embodiments of the disclosure. The controller 1820 may control the transceiver 1810 to transmit/receive a signal, information, a control message, etc. to/from other network entity according to embodiments of the disclosure.

The storage 1830 may store at least one of information transmitted/received through the transceiver 1810 and information generated through the controller 1820. For example, the storage 1830 may store network slicing configuration information or network slicing subscription information.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an access and mobility management function (AMF) in a wireless communication system, the method comprising:
 receiving, from a terminal, a registration request message including requested network slice selection assistance information (NSSAI);
 transmitting, to a unified data management (UDM), a subscription data request message including an identifier of the terminal;
 as a response to the subscription data request message, receiving, from the UDM, subscribed NSSAI for the terminal, wherein the subscribed NSSAI is based on a subscription data for the terminal in a unified data repository (UDR), a maximum number of single-NSSAIs (S-NSSAIs) in the subscription data is $2^{32}$, and a maximum number of S-NSSAIs of the subscribed NSSAI that is received from the UDM is 16; and
 determining allowed NSSAI for the terminal including at least one S-NSSAI based on the requested NSSAI and the subscribed NSSAI.

2. The method of claim 1, wherein the identifier of the terminal is a subscription permanent identifier (SUPI) of the terminal.

3. The method of claim 1, further comprising:
identifying pending NSSAI including at least one S-NSSAI that is subject to a network slice-specific authentication and authorization (NSSAA).

4. A method performed by a unified data management (UDM) in a wireless communication system, the method comprising:
receiving, from an access and mobility management function (AMF), a subscription data request message including an identifier of a terminal;
retrieving, from a unified data repository (UDR), a subscription data for the terminal based on the identifier of the terminal; and
as a response to the subscription data request message, transmitting, to the AMF, subscribed network slice selection assistance information (NSSAI) for the terminal based on the subscription data,
wherein a maximum number of single-NSSAIs (S-NSSAIs) in the subscription data is $2^{32}$ and a maximum number of S-NSSAIs of the subscribed NSSAI that is transmitted to the AMF is 16.

5. The method of claim 4, wherein the identifier of the terminal is a subscription permanent identifier (SUPI) of the terminal.

6. The method of claim 4, wherein at least one S-NSSAI that is subject to a network slice-specific authentication and authorization (NSSAA) is included in pending NSSAI.

7. An access and mobility management function (AMF) in a wireless communication system, the AMF comprising:
a transceiver; and
a controller configured to:
receive, from a terminal via the transceiver, a registration request message including requested network slice selection assistance information (NSSAI),
transmit, to a unified data management (UDM) via the transceiver, a subscription data request message including an identifier of the terminal,
as a response to the subscription data request message, receive, from the UDM via the transceiver, subscribed NSSAI for the terminal, wherein the subscribed NSSAI is based on a subscription data for the terminal in a unified data repository (UDR), a maximum number of single-NSSAIs (S-NSSAIs) in the subscription data is $2^{32}$, and a maximum number of S-NSSAIs of the subscribed NSSAI that is received from the UDM is 16, and
determine allowed NSSAI for the terminal including at least one S-NSSAI based on the requested NSSAI and the subscribed NSSAI.

8. The AMF of claim 7, wherein the identifier of the terminal is a subscription permanent identifier (SUPI) of the terminal.

9. The AMF of claim 7, wherein the controller is further configured to:
identify pending NSSAI including at least one S-NSSAI that is subject to a network slice-specific authentication and authorization (NSSAA).

10. A unified data management (UDM) in a wireless communication system, the UDM comprising:
a transceiver; and
a controller configured to:
receive, from an access and mobility management function (AMF) via the transceiver, a subscription data request message including an identifier of a terminal,
retrieve, from a unified data repository (UDR), a subscription data for the terminal based on the identifier of the terminal, and
as a response to the subscription data request message, transmit, to the AMF via the transceiver, subscribed network slice selection assistance information (NSSAI) for the terminal based on the subscription data,
wherein a maximum number of single-NSSAIs (S-NSSAIs) in the subscription data is $2^{32}$ and a maximum number of S-NSSAIs of the subscribed NSSAI that is transmitted to the AMF is 16.

11. The UDM of claim 10, wherein the identifier of the terminal is a subscription permanent identifier (SUPI) of the terminal.

12. The UDM of claim 10, wherein at least one S-NSSAI that is subject to a network slice-specific authentication and authorization (NSSAA) is included in pending NSSAI.

* * * * *